US008416438B2

(12) United States Patent
Suse

(10) Patent No.: US 8,416,438 B2
(45) Date of Patent: Apr. 9, 2013

(54) IMAGE PROCESSING APPARATUS

(75) Inventor: Koichi Suse, Tokyo (JP)

(73) Assignee: Ricoh Company Limited, Tokyo (JP)

( * ) Notice: Subject to any disclaimer, the term of this patent is extended or adjusted under 35 U.S.C. 154(b) by 1051 days.

(21) Appl. No.: 12/382,785

(22) Filed: Mar. 24, 2009

(65) Prior Publication Data

US 2009/0244602 A1 Oct. 1, 2009

(30) Foreign Application Priority Data

Mar. 26, 2008 (JP) ................................ 2008-081660

(51) Int. Cl.
*G06F 3/12* (2006.01)
*G06K 15/00* (2006.01)
*H04N 1/46* (2006.01)

(52) U.S. Cl.
USPC .......................... 358/1.15; 358/1.16; 358/501

(58) Field of Classification Search ........................ None
See application file for complete search history.

(56) References Cited

U.S. PATENT DOCUMENTS 6,330,611 B1 * 12/2001 Itoh et al. ...................... 709/229
2002/0052897 A1 * 5/2002 Nishikawa et al. ........... 707/527
2005/0162708 A1 * 7/2005 Takahashi ..................... 358/471
2008/0013848 A1 * 1/2008 Wu et al. ....................... 382/254
2008/0062464 A1 * 3/2008 Sugi ............................ 358/1.16
2008/0124004 A1 5/2008 Suse
2008/0309991 A1 12/2008 Suse

FOREIGN PATENT DOCUMENTS

JP 3349864 9/2002
JP 2003-244412 8/2003
JP 2004-072370 3/2004
JP 2004-072527 3/2004
JP 2004-112240 4/2004
JP 3679349 5/2005
JP 2006-128553 5/2006
JP 2008-072240 3/2008
JP 2008-311872 12/2008

OTHER PUBLICATIONS

Abstract of JP 2002-084383 published Mar. 22, 2002.
Abstract of JP 08-278723 published Oct. 22, 1996.

* cited by examiner

*Primary Examiner* — Fan Zhang
(74) *Attorney, Agent, or Firm* — Harness, Dickey & Pierce, P.L.C.

(57) ABSTRACT

An image processing apparatus includes an input control unit, a processing unit, an output control unit, a first sending unit, and a second sending unit. When an output request including a unique identifier and a data generation condition of image data is received, the first sending unit writes the image data corresponding to the unique identifier in the processing unit. The processing unit compares the image data written by the first sending unit with the data generation condition thereby determining a processing condition, processes the image data based on the processing condition, and outputs the processed image data to the output control unit via the second sending unit.

11 Claims, 20 Drawing Sheets

IMAGE PROCESSING APPARATUS

CROSS-REFERENCE TO RELATED APPLICATIONS

The present application claims priority to and incorporates by reference the entire contents of Japanese priority document 2008-081660 filed in Japan on Mar. 26, 2008.

BACKGROUND OF THE INVENTION

1. Field of the Invention

The present invention relates to an image processing apparatus.

2. Description of the Related Art

Recently, a central processing unit (CPU) is incorporated in an image forming apparatus in the same manner as in a general-purpose computer and the CPU is used to run various applications to control various operations of the image forming apparatus. Examples of such image processing apparatuses are printers, copiers, scanners, facsimiles, or multifunction products (MFPs) in which various functions are bundled together in one casing.

Japanese Patent No. 3679349 discloses an image forming apparatus in which a function to be shared among different applications is prepared as a platform and an application programming interface (API) included in the platform is used to implement the applications.

Japanese Patent Application Laid-open No. 2004-072527 discloses an MFP in which an image obtained by scanning is marked with a specific color to specify a closed area in the image, the closed area is extracted, and the image within or out of the closed area is used in accordance with the specific color.

Japanese Patent Application Laid-open No. 2003-244412 discloses an image processing apparatus in which an original to be transmitted to multi addresses is marked with a plurality of colors in a plurality of formats, a process to be performed is determined for each marked area of the original, and if an address list containing the multi addresses needs to be edited, the address list is permanently changed by using marking data.

According to the technologies described in Japanese Patent No. 3679349, Japanese Patent Application Laid-open No. 2004-072527, and Japanese Patent Application Laid-open No. 2003-244412, because the function to be shared in the applications is prepared as the platform, it is possible to customize functions as desired, and expand functions as desired, and prevent unnecessary overlapping of function.

However, if a function to be provided by the platform, or the interface (I/F) granularity, is not properly designed, it is often difficult to increase the development efficiency of applications.

For example, if the granularity is too fine, many API calls are required even for an application that provides a simple service, and the source code of the application becomes complicated.

On the other hand, if the granularity is too coarse, when an application for providing a service in which a part of a specific function is changed is to be implemented, the platform needs to be changed, which can increase man-hours for development. Especially, if dependency between modules in the platform is strong, it is often necessary, not only to add a new function to the platform, but also to change an existing part, which causes a complicated process.

Moreover, when an application in which a part of service (for example, an input operation of an image) provided by an existing application has been changed is to be implemented, the existing application cannot be called to provide a part of the service that has not been changed. Therefore, it is necessary to describe a new source code and implement a new application.

SUMMARY OF THE INVENTION

It is an object of the present invention to at least partially solve the problems in the conventional technology.

According to an aspect of the present invention, there is provided an image processing apparatus including an input control unit that controls input of image data; a processing unit that processes the image data; an output control unit that controls output of the image data; a first sending unit that sends the image data from the input control unit to the processing unit; and a second sending unit that sends the image data from the processing unit to the output control unit. The input control unit assigns a unique identifier to the image data and writes the image data and the unique identifier in the first sending unit, upon receiving an output request including a unique identifier and a data generation condition of the image data, the output control unit sends a data read request including the unique identifier and the data generation condition to the second sending unit, the second sending unit sends the data read request to the processing unit, the processing unit sends the data read request to the first sending unit, the first sending unit writes the image data corresponding to the unique identifier included in the data read request in the processing unit, and the processing unit compares the image data written by the first sending unit with the data generation condition included in the data read request received from the second sending unit thereby determining a processing condition required for outputting the image data based on the data generation condition, processes the image data based on the processing condition to generate processed image data, and outputs the processed image data to the output control unit via the second sending unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. Although the embodiments are explained by using an MFP in which a printer function, a copy function, a scanner function, and a facsimile function are bundled together in one casing, the embodiments can be implemented on other image forming/processing apparatuses. For example, the embodiments can be implemented on a scanner apparatus, a facsimile apparatus, or an ordinary computer.

In the following embodiments, software architecture based on an idea called Pipe and Filter is applied to the image processing apparatus in order to allow easy customization or expansion of functions of the image processing apparatus. An identifier is assigned to data and a read request including the identifier and a data generation condition is sent from an output unit to an input unit, so that the output unit can obtain desired data on which a process has been performed in accordance with a condition determined by the output unit. Furthermore, an output filter controls data read from a pipe, and if a condition determined by the output unit is changed in a middle of a process, the output filter requests data from the pipe again and acquires the data on which a different process has been performed.

Figure 1:
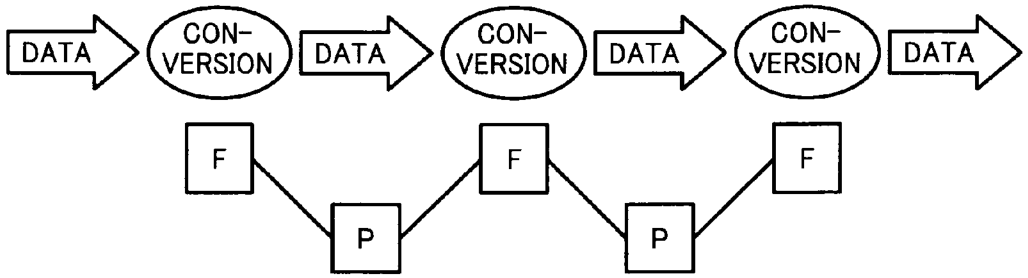
FIG. 1 is a schematic diagram for explaining the idea of Pipe and Filter.

FIG. 1 is a schematic diagram for explaining the idea of Pipe and Filter. Filters F are computer programs that perform a predetermined process on input data and output the processed data as a process result, and pipes P connect the filters F to each other. The pipe P temporarily holds the processed data output from the filter F connected to the input side of the pipe P and then sends the data to the filter F connected to the output side of the pipe P. Thus, based on the idea of Pipe and Filter, it is possible to perform continuous processing in the filters F via the pipes P.

It is assumed below that the filters F are to perform a predetermined conversion process on input data. Specifically, each function to be performed by the image processing apparatus is regarded as successive "conversion processes" to be performed on a document (input data). It is considered that each function to be performed by the image processing apparatus includes an input operation, a processing operation, and an output operation of a document. Therefore, each of the input operation, the processing operation, and the output operation is regarded as "a conversion process", and a software component for performing one conversion process is configured as the filter F.

A filter that controls a data input operation is an input filter, a filter that controls a data processing operation is a process filter, and a filter that controls a data output operation is an output filter. Each of the filters is an independent computer program and can be independently added (installed) or deleted (uninstalled) in the image processing apparatus.

Figure 2:
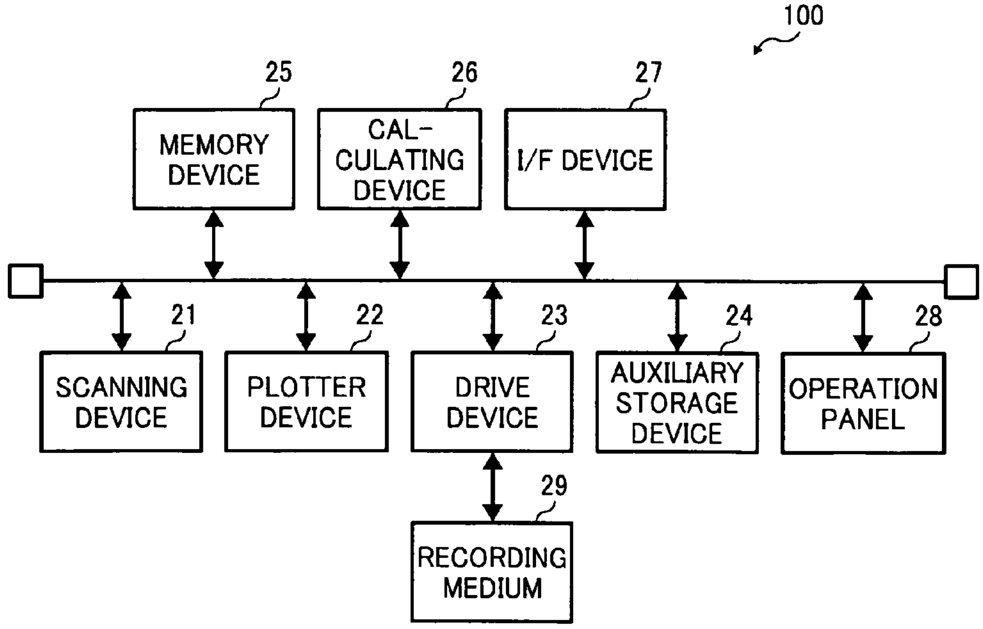
FIG. 2 is a block diagram for explaining the hardware configuration of an image processing apparatus according to a first embodiment of the present invention.

FIG. 2 is a block diagram for explaining the hardware configuration of an image processing apparatus 100 according to a first embodiment of the present invention. The image processing apparatus 100 includes a scanning device 21, a plotter device 22, a drive device 23, an auxiliary storage device 24, a memory device 25, a calculating device 26, an I/F device 27, and an operation panel 28. They are connected to one another via a bus.

The scanning device 21 includes a scanner engine (not shown) and an engine control unit (not shown). The scanning device 21 scans an original to obtain image data. The plotter device 22 includes a plotter engine (not shown) and an engine control unit (not shown). The plotter device 22 prints out the image data. The I/F device 27 includes a modem (not shown) and a local area network (LAN) card (not shown). The I/F device 27 is used for network connection. The operation panel 28 is used for performing an operation in relation to a process to be executed by the image processing apparatus 100. The operation panel 28 is a touch panel, or the like, having a display function.

An image processing program according to the first embodiment is at least a part of various computer programs for controlling the image processing apparatus 100. The image processing program is provided by, for example, distributing a recording medium 29 in which the image processing program is stored or is downloaded via a network. The recording medium 29 can be various types of recording media. For example, it can be a recording medium, such as a compact disk read only memory (CD-ROM), a flexible disk, or a magnetooptic disk, in which data is stored optically, electrically, or magnetically, or a semiconductor memory, such as a read-only memory (ROM) or a flash memory, in which data is stored electrically.

When the recording medium 29 is inserted into the drive device 23, the image processing program is installed from the recording medium 29 into the auxiliary storage device 24 via the drive device 23. On the other hand, it the image processing program is downloaded from the network, it is installed into the auxiliary storage device 24 via the I/F device 27.

Necessary files and data as well as the installed image processing program are stored in the image processing apparatus 100. The memory device 25 reads the image processing program from the auxiliary storage device 24 when a computer is started up, and stores therein the read image processing program. The calculating device 26 performs a function of each unit described later in accordance with the image processing program stored in the memory device 25, thereby performing various operations.

Figure 3:
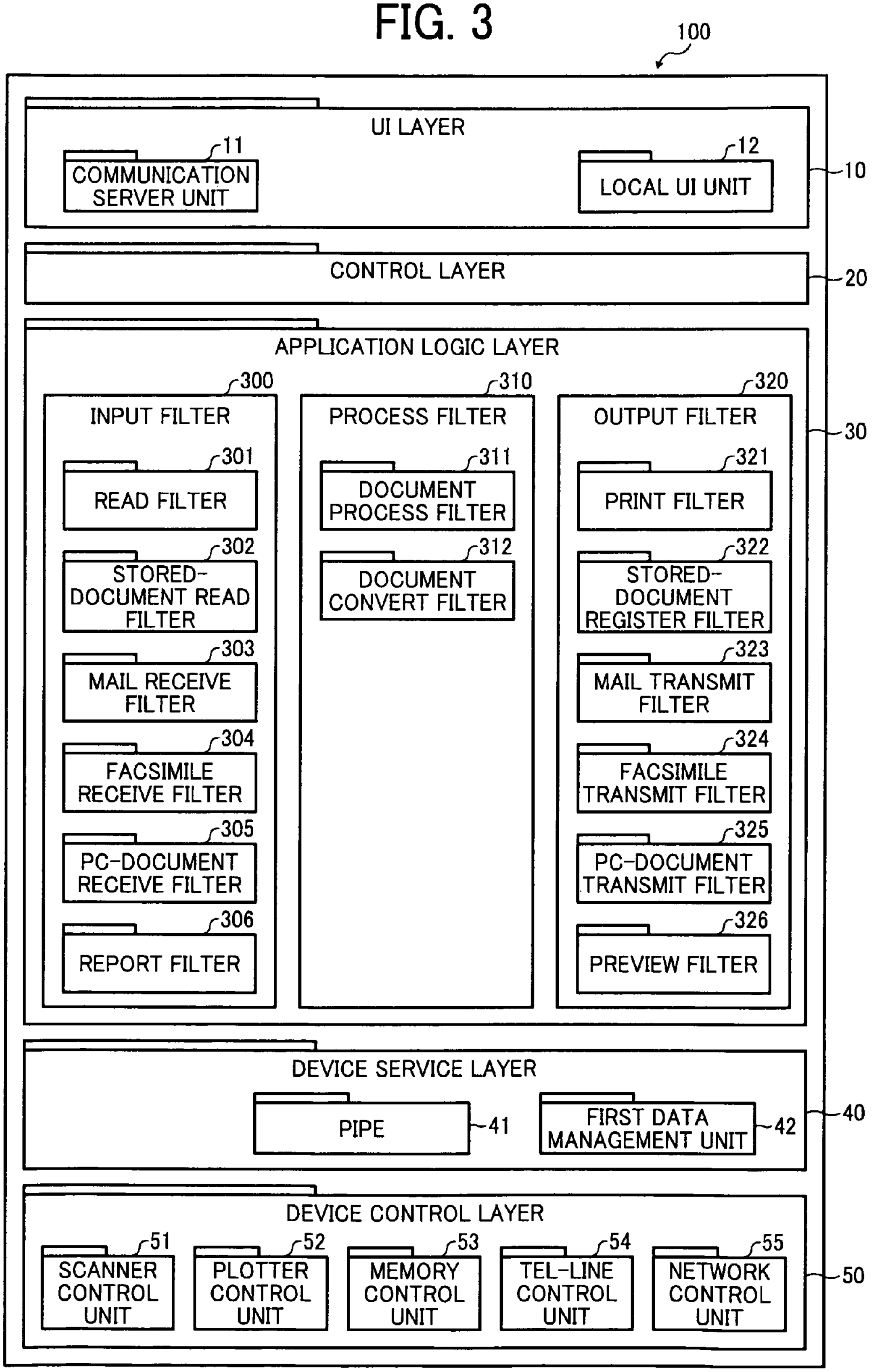
FIG. 3 is a block diagram for explaining the software configuration of the image processing apparatus according to the first embodiment.

The idea of Pipe and Filter is applied to software architecture for performing various functions in the image processing apparatus 100. FIG. 3 is a block diagram for explaining the software configuration of the image processing apparatus 100. The image processing apparatus 100 is an MFP that performs a plurality of functions of a printer, a copier, a scanner, a facsimile, and the like, in one casing.

Software for performing functions of the image processing apparatus 100 has a hierarchical structure including a user interface (UI) layer 10, a control layer 20, an application logic layer 30, a device service layer 40, and a device control layer 50. A hierarchical relation between the layers is defined based on a call relation between the layers. Specifically, as shown in FIG. 3, the upper layer calls the lower layer.

When the UI layer 10 receives an execution instruction of various functions from a user, the UI layer 10 calls the control layer 20 to control the application logic layer 30 based on the received execution instruction. The application logic layer 30 executes an application for performing a requested function based on an instruction from the control layer 20. The device service layer 40 and the device control layer 50 then control a hardware resource of the image processing apparatus 100 based on the execution result. As a result of the above operation, the image processing apparatus 100 obtains an output result corresponding to the function based on the instruction received by the UI layer 10.

A communication server unit 11 and a local UI unit 12 are implemented in the UI layer 10. The UI layer 10 has a function of receiving an execution request for performing various functions of the image processing apparatus 100. The various functions include, for example, a copy function, a print function, a scan function, and a facsimile function. It is possible that the communication server unit 11 receives an execution request from a client personal computer (PC) (not shown), or the like, via a network. It is also possible that the local UI unit 12 receives an execution request via the operation panel 28, or the like. The structure and functions of the operation panel 28 will be explained in detail later. An execution request received by the UI layer 10 is sent to the control layer 20.

The control layer 20 is a control unit in which a function for controlling a process to perform each function of the image processing apparatus 100 is implemented. Specifically, the control layer 20 connects filters in the application logic layer 30 by using a pipe 41 depending on a requested function and controls execution of the function by using the connected filters.

The control layer 20 controls the pipe 41 based on an execution request received by the UI layer 10. How the pipe 41 is controlled by the control layer 20 will be described in detail later.

A function of the image processing apparatus 100 is defined as a unit of service (from when a request is received to when a final output is obtained) to be provided to the user by the image processing apparatus 100, and is synonymous with an application for providing a unit of service in terms of software.

Various filters that constitute a group of components for performing a part of functions provided by the image processing apparatus 100 are implemented in the application logic layer 30. The application logic layer 30 performs one function by combining a plurality of filters under the control of the control layer 20. An input filter 300, a process filter 310, and an output filter 320 are implemented in the application logic layer 30. Each of the input filter 300, the process filter 310, and the output filter 320 is operated based on the same definition and controlled by the control layer 20 based on the definition. The configurations and the operations of the filters 300, 310, and 320 will be described in detail later.

A lower level function in which each filter implemented in the application logic layer 30 is shared is implemented in the device service layer 40. The pipe 41 and a first data management unit 42 are implemented in the device service layer 40. The pipe 41 is the pipe P illustrated in FIG. 1, and sends an output result obtained from one filter implemented in the application logic layer 30 to other filter.

The first data management unit 42 is a database included in the image processing apparatus 100. For example, it is possible that the first data management unit 42 stores therein user information registered by the user or document data or image data on which various operations have been performed by the image processing apparatus 100.

A driver that is a computer program for controlling hardware is implemented in the device control layer 50. A scanner control unit 51, a plotter control unit 52, a memory control unit 53, a telephone (Tel)-line control unit 54, and a network control unit 55 are implemented in the device control layer 50. The scanner control unit 51, the plotter control unit 52, the memory control unit 53, the Tel-line control unit 54, and the network control unit 55 control a scanner, a plotter, a memory, a telephone, and a network, respectively.

The input filter 300 controls an input operation on data received from outside of the image processing apparatus 100. The input filter 300 includes a read filter 301, a stored-document read filter 302, a mail receive filter 303, a facsimile receive filter 304, a PC-document receive filter 305, and a report filter 306.

The read filter 301 controls the scanner to read image data and outputs the read image data. The mail receive filter 303 receives an electronic mail and outputs data contained in the received electronic mail. The facsimile receive filter 304 controls reception of facsimile data and outputs the received data. The PC-document receive filter 305 receives print data from the client PC, or the like, and outputs the received print data. The report filter 306 generates setting information or log information of the image processing apparatus 100 in, for example, a tabular form, and outputs the generated data. The stored-document read filter 302 reads data from the first data management unit 42 or a storage device (not shown) included in the image processing apparatus 100 rather than from outside of the image processing apparatus 100, and outputs the read data.

The process filter 310 performs a predetermined process on data received from a pipe connected to the input side of the process filter 310, and outputs processed data as a process result to a filter connected to the output side of the process filter 310. The process filter 310 includes a document process filter 311 and a document convert filter 312. The document process filter 311 performs image conversion on input data and outputs the processed data. The image conversion can be, for example, combining, enlargement, reduction, or the like. The document convert filter 312 performs rendering on input data and outputs the processed data. Specifically, the document convert filter 312 converts received PostScript data into bitmap data, and outputs the bitmap data.

The output filter 320 controls an output operation on data and outputs the data to outside of the image processing apparatus 100. The output filter 320 includes a print filter 321, a stored-document register filter 322, a mail transmit filter 323, a facsimile transmit filter 324, a PC-document transmit filter 325, and a preview filter 326.

The print filter 321 causes the plotter to output (print out) data. The mail transmit filter 323 attaches data to an electronic mail and transmits the electronic mail. The facsimile transmit filter 324 transmits data by the facsimile. The PC-document transmit filter 325 transmits data to the client PC, or the like. The preview filter 326 previews data on the operation panel 28 or the like included in the image processing apparatus 100. Exceptionally, data output from the stored-document register filter 322 is stored in the storage device included in the image processing apparatus 100 or the first data management unit 42 rather than outside of the image processing apparatus 100.

The application logic layer 30 performs each function of the image processing apparatus 100 by combining the filters. With this configuration, the image processing apparatus 100 can perform various functions by combining the filters and the pipes. Specifically, for example, if a copy function is to be performed, the read filter 301, the document process filter 311, and the print filter 321 can be combined.

Figure 4:
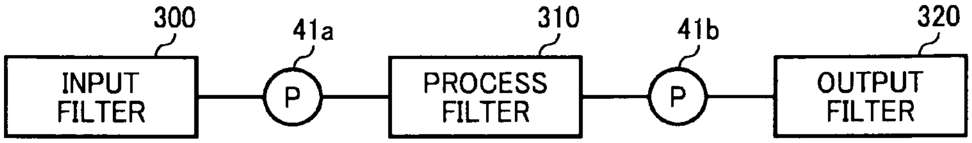
FIG. 4 is a schematic diagram for explaining the configuration of an input filter, a process filter, an output filter, a first pipe, and a second pipe in the image processing apparatus according to the first embodiment.

FIG. 4 is a schematic diagram for explaining the configuration of the input filter 300, the process filter 310, the output filter 320, a first pipe 41*a*, and a second pipe 41*b* in the image processing apparatus 100. The input filter 300 and the process filter 310 are connected to each other with the first pipe 41*a*, and the process filter 310 and the output filter 320 are connected to each other with the second pipe 41*b*.

The first pipe 41*a* temporarily holds data received from the input filter 300 and sends the data to the process filter 310. The first pipe 41*a* can also send data to the process filter 310 in response to a data read request received from the process filter 310.

The second pipe 41*b* sends data to the process filter 310 in response to a data read request received from the output filter 320. The second pipe 41*b* also acquires processed data from the process filter 310 and sends the processed data to the output filter 320. Because the first pipe 41*a* and the second pipe 41*b* are arranged between the filters 300 to 320, it is possible to perform continuous operations between the filters 300 to 320.

Figure 5:
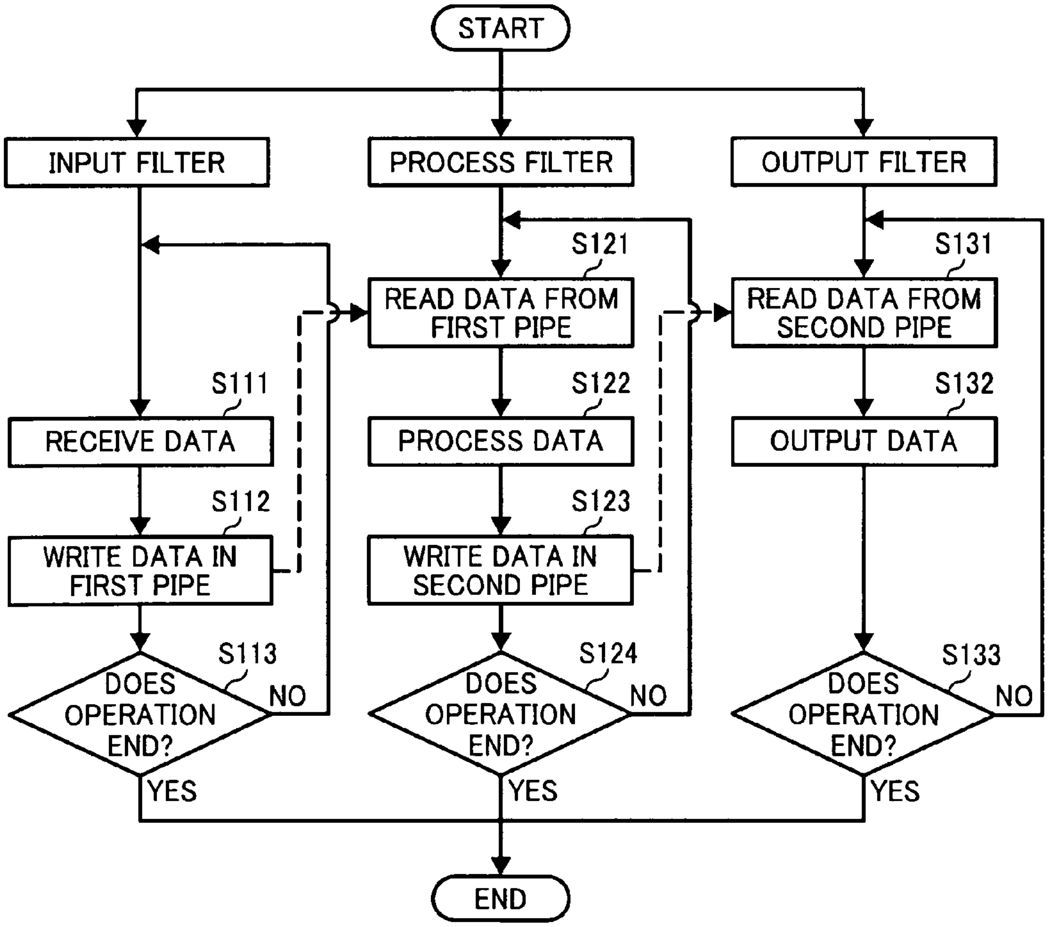
FIG. 5 is a flowchart of an operation performed by the image processing apparatus according to the first embodiment.

FIG. 5 is a flowchart of an operation performed by the image processing apparatus 100. The input filter 300 receives data from an input device (not shown) (Step S111) and writes the received data to the first pipe 41*a* connected to the output side of the input filter 300 (Step S112). If data is received by a plurality of input operations (for example, if data is obtained by scanning a plurality of originals), operations of receiving data and writing the data to the first pipe 41*a* are repeated. When the write operation ends for all of the received data (Yes at Step S113), the operation of the input filter 300 ends. If the operation does not end for all of the received data (No at Step S113), the process control returns to Step S111.

Upon detecting input of the data to the first pipe 41*a* connected to the input side of the process filter 310, the process filter 310 starts an operation. The process filter 310 reads the data from the first pipe 41*a* (Step S121) and processes the read data (Step S122). The process filter 310 then writes the processed data as a process result to the second pipe 41*b* connected to the output side of the process filter 310 (Step S123). When an operation ends for all of the data input to the first pipe 41*a* (Yes at Step S124), the operation of the process filter 310 ends. If the operation does not end for all of the data input to the first pipe 41*a* (No at Step S124), the process control returns to Step S121.

Upon detecting input of the data to the second pipe 41*b* connected to the input side of the output filter 320, the output filter 320 starts an operation. The output filter 320 reads the data from the second pipe 41*b* (Step S131). The output filter 320 then outputs the read data by using an output device (not shown) (Step S132). When an operation ends for all of the data input to the second pipe 41*b* (Yes at Step S133), the operation of the output filter 320 ends. If the operation does not end for all of the data input to the second pipe 41*b* (No at Step S133), the process control returns to Step S131.

As described above, because each function is performed by using each of the filters as a component in the image processing apparatus 100, it is possible to easily customize or expand a function. Specifically, because there is no functional dependency between the filters, i.e., independency of the filters is maintained, it is possible to easily develop a new function (application) by adding a new filter or changing a combination of the filters. Therefore, when a new application is to be implemented, if a filter for performing a part of an operation of the new application is not available, only such a filter needs to be developed and installed. Thus, it is possible to reduce frequency of change to be required in accordance with implementation of a new application in the lower layer than the control layer 20 and the application logic layer 30, and a stable platform can be provided.

Therefore, it is possible to improve development efficiency of an application without being influenced by a function provided by the platform or granularity of the I/F. Moreover, if an application in which a part of a service provided by an existing application is changed is to be implemented, only a part of filters for providing the service needs to be changed. Therefore, it is not necessary to describe a new source code, and the development efficiency can be improved.

Figure 6:
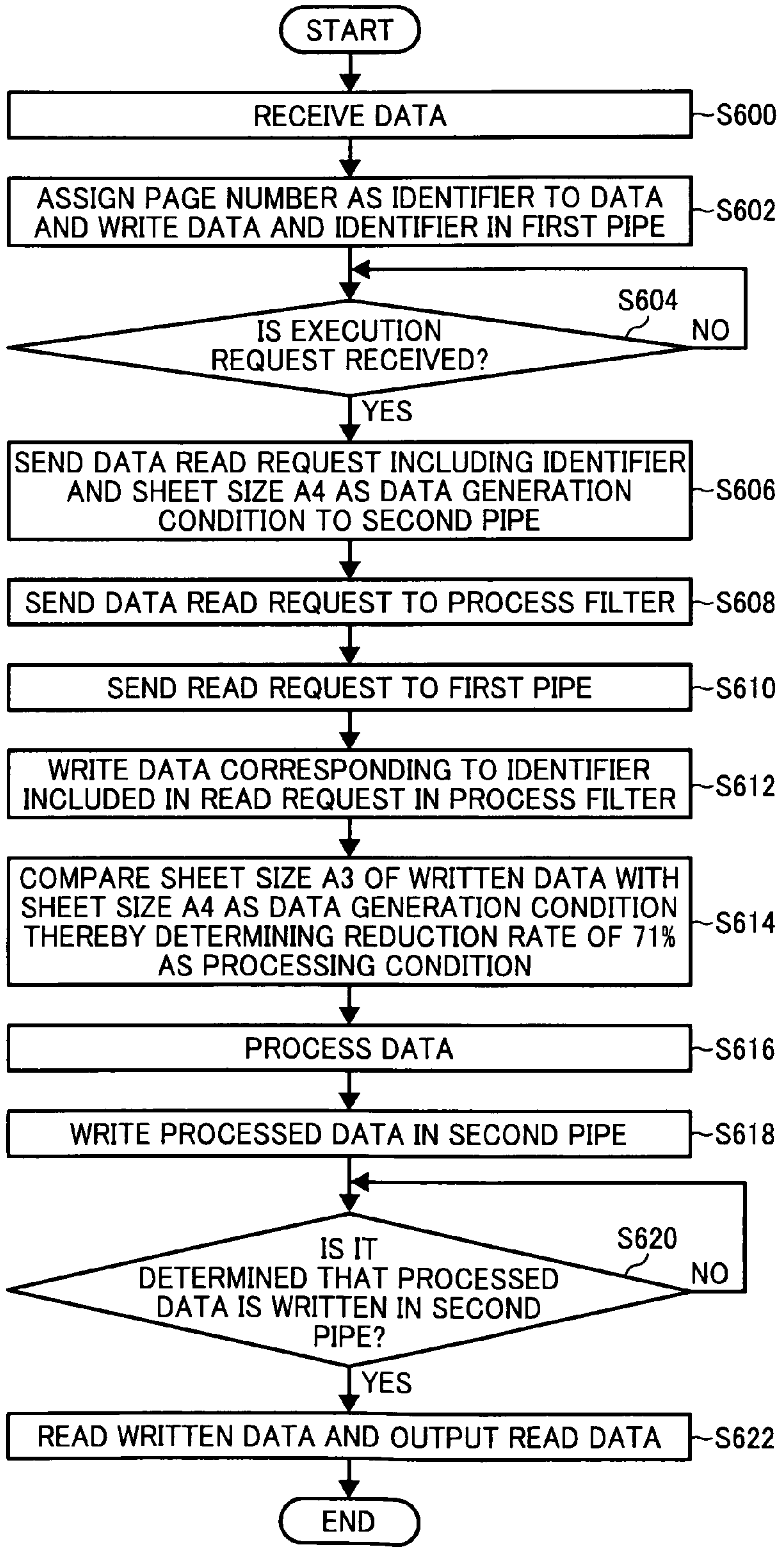
FIG. 6 is a flowchart of an operation performed by the image processing apparatus according to the first embodiment from when a read request is received to when data output is executed.

FIG. 6 is a flowchart of an operation performed by the image processing apparatus 100 from when a read request is received to when data output is executed. The image processing apparatus 100 has a basic reduce/enlarge function in which data is reduced or enlarged into a preset sheet size and an advanced reduce/enlarge function in which data is reduced or enlarged at any ratio.

When the input filter 300 receives data from the user (Step S600), the input filter 300 assigns a page number as an identifier to the received data and writes the data and the identifier in the first pipe 41*a* in an associated manner (Step S602). The received data can include data about a sheet size, a sheet orientation, and the like. It is assumed here that the sheet size A3 is written in association with the data and the identifier. Although it is explained in the first embodiment that the page number is assigned as the identifier, a number can be assigned to data in order, beginning with the first data acquired by the input filter 300. For example, in the case of image data read by the scanning device 21, it is possible that a data number is assigned to data in order, beginning with the first data read by the scanning device 21, and the data number is used as the identifier. The identifier is not limited to such an order. Any identifier can be used if data can be identified with the identifier. For example, a sheet size, resolution, an image quality mode, or the like, of input data can be used as the identifier.

The output filter 320 then determines whether an execution request of a data output operation is received from the user (Step S604). If it is determined that the execution request of the data output operation is received from the user (Yes at Step S604), the output filter 320 sends a data read request including an identifier associated with data to be output and the sheet size A4 as a data generation condition to the second pipe 41*b* (Step S606). The second pipe 41*b* sends the data read request to the process filter 310 (Step S608). If it is not determined that the execution request of the data output operation is received from the user (No at Step S604), the output filter 320 repeats determination until the output filter 320 receives the execution request of the data output operation.

The process filter 310 sends a read request to the first pipe 41*a* to perform a processing operation on data corresponding to the identifier included in the data read request (Step S610). As described above at Step S602, the data associated with the identifier is written in the first pipe 41*a*. Upon receiving the read request from the process filter 310, the first pipe 41*a* writes data corresponding to the identifier included in the read request in the process filter 310 (Step S612).

Figure 7:
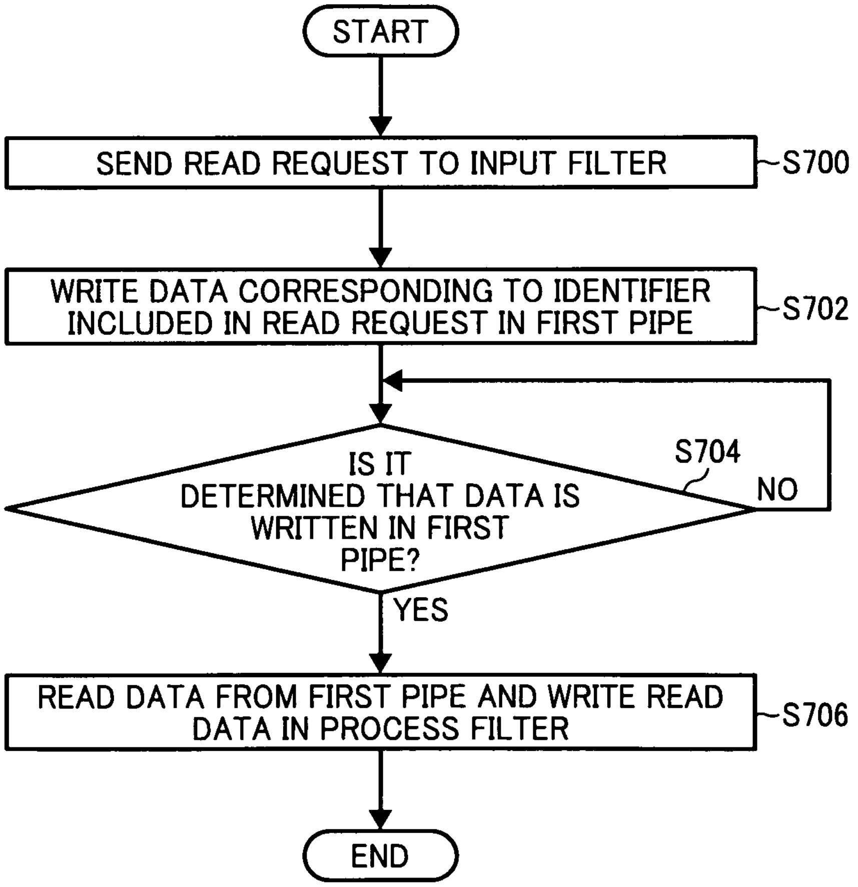
FIG. 7 is a flowchart of an operation performed by the image processing apparatus according to the first embodiment from when a read request is received by the first pipe to when data is written in the process filter.

FIG. 7 is a flowchart of an operation performed by the image processing apparatus 100 from when a read request is received by the first pipe 41*a* to when data is written in the process filter 310. The input filter 300 is assumed to be the stored-document read filter 302, or the like. An identifier is assigned to data, and the data is stored in a storage device (not shown) included in the image processing apparatus 100 in advance. The storage device is configured by a storage medium, such as the memory device 25, a hard disk drive (HDD), or the auxiliary storage device 24.

The first pipe 41*a* sends the read request received from the process filter 310 to the input filter 300 (Step S700). The input filter 300 writes data corresponding to the identifier included in the read request in the first pipe 41*a* (Step S702).

The process filter 310 then determines whether the data is written in the first pipe 41*a* (Step S704). If it is determined that the data is written in the first pipe 41*a* (Yes at Step S704), the process filter 310 reads the data from the first pipe 41*a* and writes the read data in the process filter 310 (Step S706). On the other hand, if it is not determined that the data is written in the first pipe 41*a* (No at Step S704), the process filter 310 repeats determination until the process filter 310 determines that the data is written in the first pipe 41*a*.

Referring back to FIG. 6, the process filter 310 compares the sheet size A3 of the data written at Step S602 with the sheet size A4 as the data generation condition, thereby determining a reduction ratio of 71% as the processing condition (Step S614). The process filter 310 reduces the data size based on the determined processing condition (Step S616), and writes the processed data in the second pipe 41*b* (Step S618).

The output filter 320 determines whether the processed data is written in the second pipe 41*b* (Step S620). If it is determined that the processed data is written in the second pipe 41*b* (Yes at Step S620), the output filter 320 reads the written data from the second pipe 41*b* outputs the read data (Step S622). On the other hand, if it is not determined that the processed data is written in the second pipe 41*b* (No at Step S620), the output filter 320 repeats determination until the output filter 320 determines that data is written in the second pipe 41*b*.

Although it is explained in the first embodiment that the process filter 310 enlarges or reduces the data size in accordance with an output request, it is possible to configure the input filter 300 so as to change the data size into a predetermined sheet size when the data is input.

Figure 8:
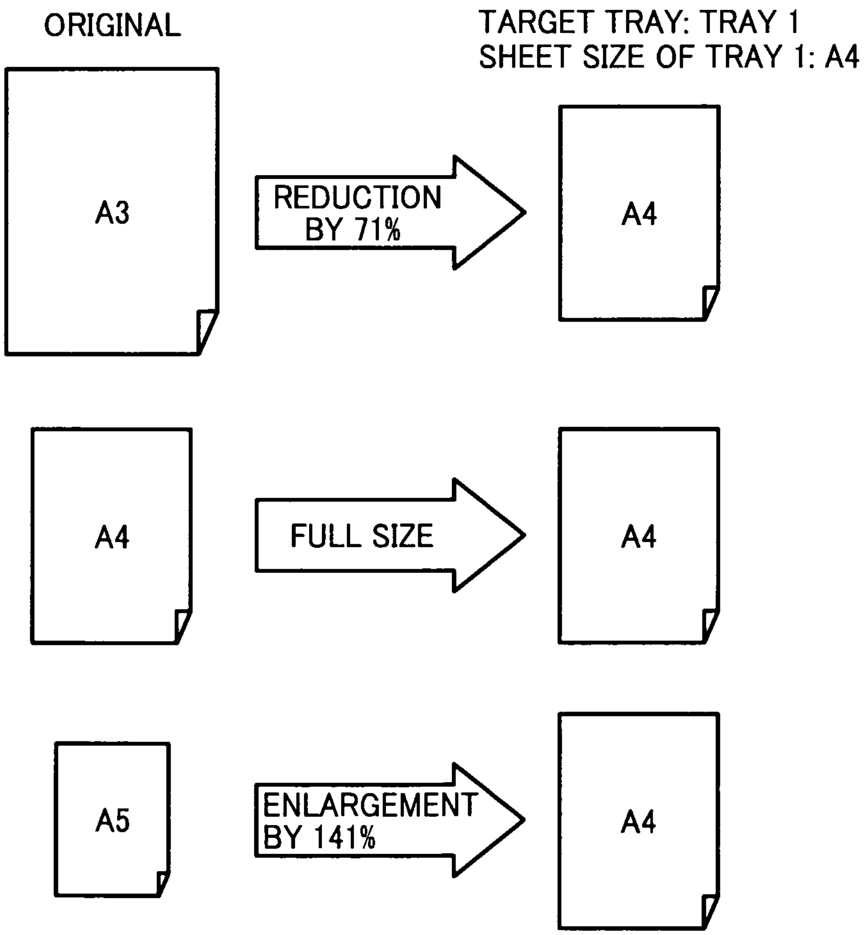
FIG. 8 is a schematic diagram for explaining a basic reduce/enlarge function in the image processing apparatus according to the first embodiment.

FIG. 8 is a schematic diagram for explaining the basic reduce/enlarge function. Data sets on originals each including a document or an image that are written in the first pipe 41*a* are shown on the left-hand side of FIG. 8. Data sets on which a basic reduce/enlarge process has been performed by the process filter 310 in accordance with an output request are shown in the right-hand side of FIG. 8. Predetermined ratios are set in advance for the basic reduce/enlarge process. For example, ratios of 25%, 50%, 61%, 71%, 82%, and 87% are set for reduction, ratio of 100% for full size, and ratios of 115%, 122%, 141%, 200%, and 400% for enlargement.

The data sets having the sheet sizes A3, A4, and A5 that are written in the first pipe 41*a* are reduced, enlarged, or generated in full size by the input filter 300 based on determined processing conditions, and are output as data sets having the sheet size A4. Although it is explained in the first embodiment that the image processing apparatus 100 has the basic reduce/enlarge function, it is possible to configure the image processing apparatus 100 so as to further include the advanced reduce/enlarge function. Moreover, an image quality mode can be set as the processing condition. The image quality mode includes a character mode for output of a clear character, a photographic mode for output with high image quality, and a character/photographic mode for output of a document including a character and a photograph in a mixed manner.

As described above, an application is configured by connecting the input filter 300, the process filter 310, and the output filter 320 via the first pipe 41*a* and the second pipe 41*b*, so that each of the filters 300, 310, and 320 functions independently whereby it is possible to simplify customization and expansion of a function.

Moreover, the input filter 300 assigns an identifier to data and the output filter 320 sends a read request including the identifier and a data generation condition to the process filter 310, so that a request from the output filter 320 can be reflected on the input filter 300 in an easy manner. As a result, it is possible to set detailed settings of a process in the input filter 300 and the process filter 310 depending on an output request and to customize a function, resulting in an improved performance.

Furthermore, the image processing apparatus 100 has the basic reduce/enlarge function and the advanced reduce/enlarge function, and the data read request including the sheet size as the data generation condition is sent to the process filter 310, so that it is possible to enlarge or reduce an image size in accordance with a read request. Therefore, when data cannot be output with a predetermined sheet size due to run out of sheet, sheet jam, or the like, data is reduced, enlarged, or generated in full size so that the processed data can be promptly output from a different feed tray with a different sheet size.

Figure 9A:
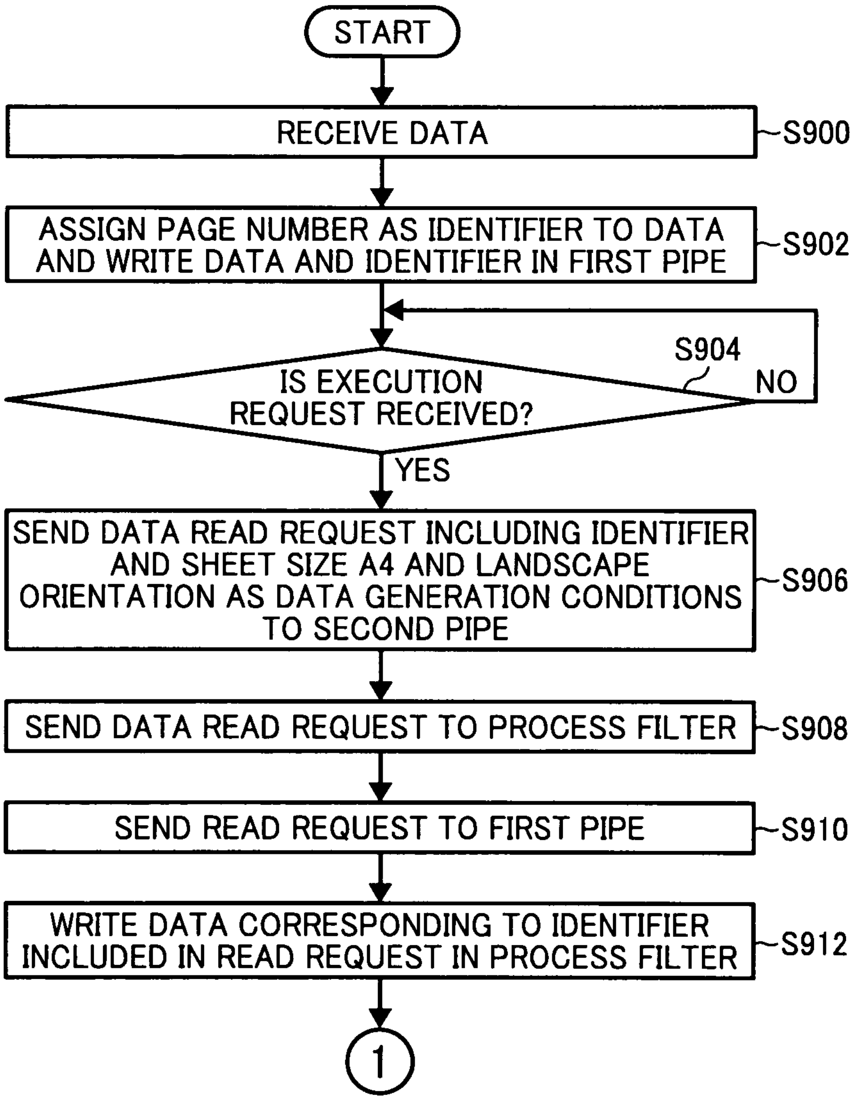
FIG. 9A is a flowchart of an operation performed by the image processing apparatus according to an example 1 of the first embodiment from when a read request is received to when output of data is executed.
Figure 9B:
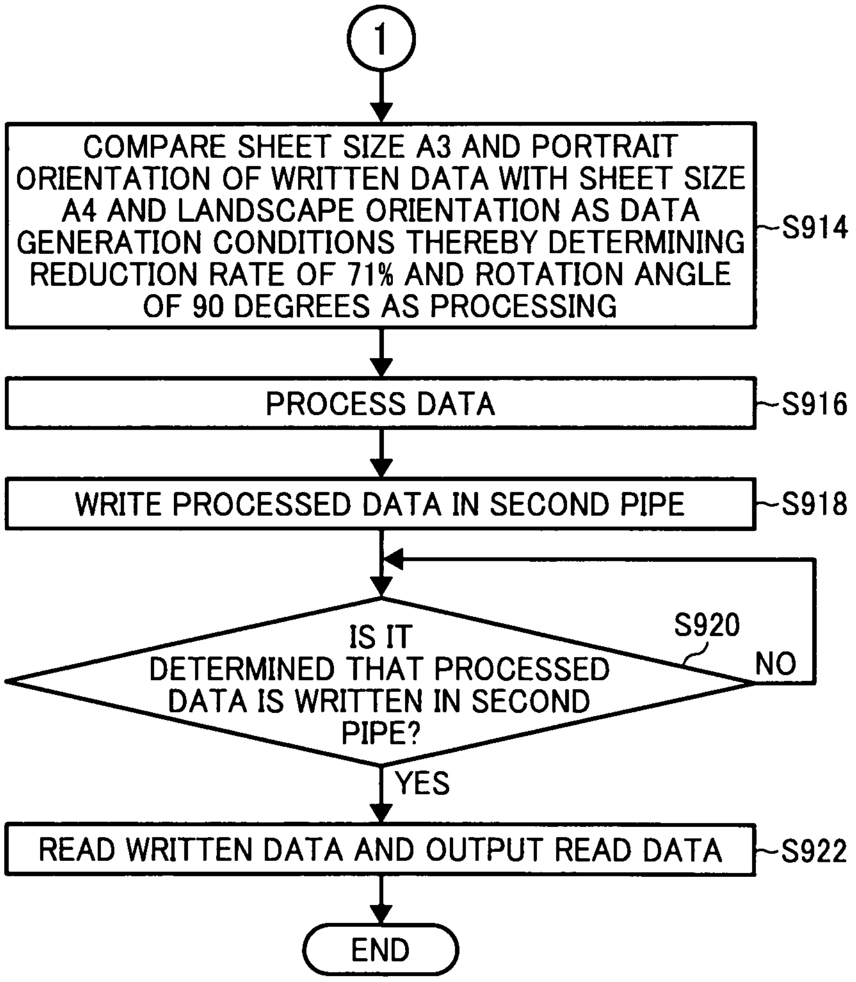
FIG. 9B is a continuation of the flowchart illustrated in FIG. 9A.

FIGS. 9A and 9B is a flowchart of an operation performed by the image processing apparatus according to an example 1 of the first embodiment from when a read request is received to when output of data is executed.

When the input filter 300 receives data from the user (Step S900), the input filter 300 assigns a page number as an identifier to the received data and writes the data and the identifier in the first pipe 41*a* in an associated manner (Step S902). The received data can include data about a sheet size, a sheet orientation, and the like. In the example 1 of the first embodiment, the sheet size A3 and the portrait orientation are written in association with the data and the identifier.

The output filter 320 determines whether an execution request of a data output operation is received from the user (Step S904). If it is determined that the execution request of the data output operation is received from the user (Yes at Step S904), the output filter 320 sends a data read request including an identifier associated with data to be output and the sheet size A4 and the landscape orientation as data generation conditions to the second pipe 41*b* (Step S906). The second pipe 41*b* sends the data read request including the identifier and the data generation conditions to the process filter 310 (Step S908). If it is not determined that the execution request of the data output operation is received from the user (No at Step S904), the output filter 320 repeats determination until the output filter 320 receives the execution request of the data output operation.

The process filter 310 sends a read request to the first pipe 41*a* to process data corresponding to the identifier included in the data read request (Step S910). As described above at Step S902, the data associated with the identifier is written in the first pipe 41*a*. Upon receiving the read request from the process filter 310, the first pipe 41*a* writes data corresponding to the identifier included in the read request in the process filter 310 (Step S912). A process from when the first pipe 41*a* receives the read request from the process filter 310 to when the data corresponding to the identifier included in the read request is written in the process filter 310 is the same as that described with reference to FIG. 7, and therefore its explanation is omitted.

The process filter 310 compares the sheet size A3 and the portrait orientation of the data written at Step S902 with the sheet size A4 and the landscape orientation as the data generation conditions, thereby determining a reduction ratio of 71% and a rotation angle of 90 degrees as processing conditions (Step S914 in FIG. 9B). The process filter 310 reduces the data size and rotates the sheet orientation associated with the data based on the determined processing conditions (Step S916), and writes the processed data in the second pipe 41*b* (Step S918).

The output filter 320 determines whether the processed data is written in the second pipe 41*b* (Step S920). If it is determined that the processed data is written in the second pipe 41*b* (Yes at Step S920), the output filter 320 reads the written data from the second pipe 41*b* and outputs the read data (Step S922). On the other hand, if it is not determined that the processed data is written in the second pipe 41*b* (No at Step S920), the output filter 320 repeats determination until the output filter 320 determines that the data is written in the second pipe 41*b*.

Figure 10:
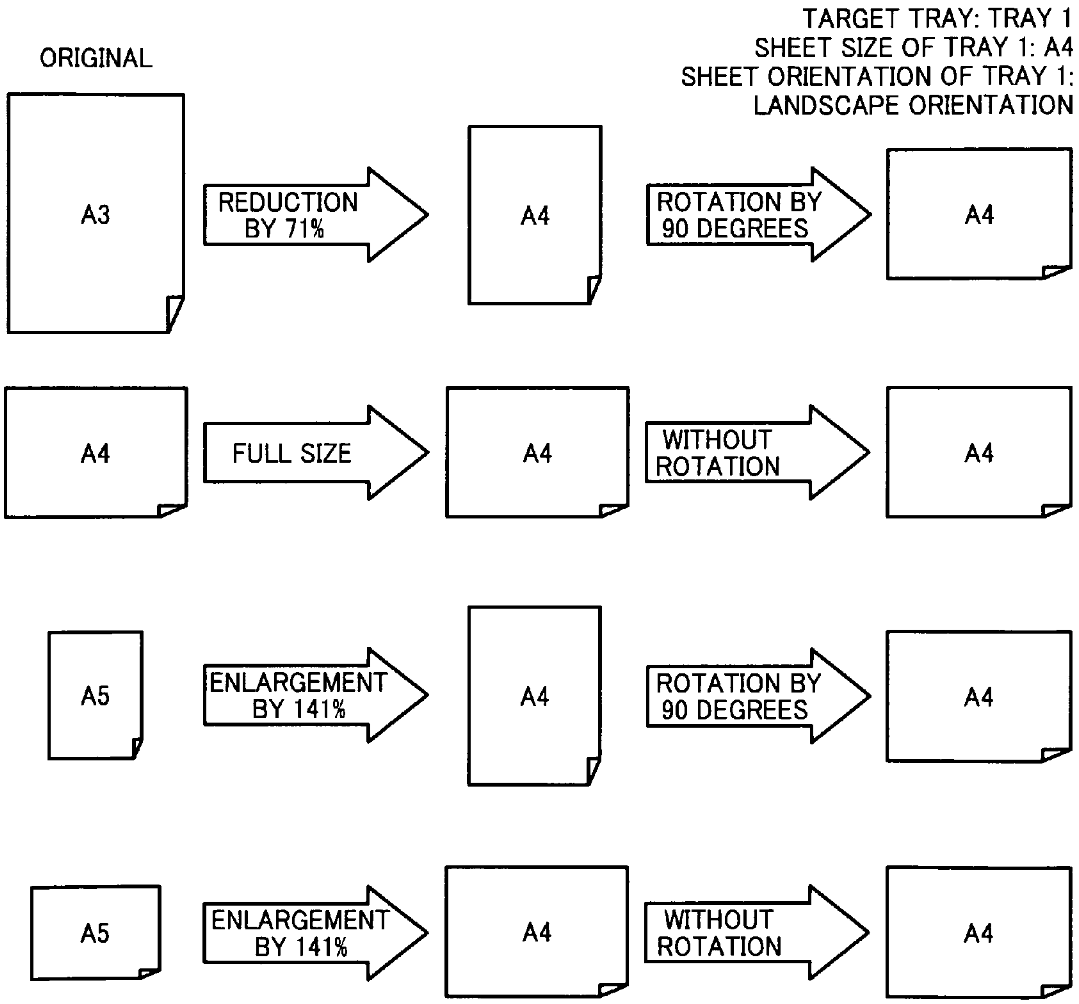
FIG. 10 is a schematic diagram for explaining the basic reduce/enlarge function and a rotate sort function in the image processing apparatus according to the example 1 of the first embodiment.

FIG. 10 is a schematic diagram for explaining the basic reduce/enlarge function and a rotate sort function. Data sets on originals each including a document or an image that are written in the first pipe 41*a* are shown on the left-hand side of FIG. 10. Data having the sheet size A3 and the portrait orientation, data having the sheet size A4 and the landscape orientation, data having the sheet size A5 and the portrait orientation, and data having the sheet size A5 and the landscape orientation are shown as examples of data written in the first pipe 41*a*. Data sets on which the basic reduce/enlarge process and the rotation process have been performed by the process filter 310 in accordance with an output request are shown in the right-hand side of FIG. 10. The basic reduce/enlarge function is the same as that described in the first embodiment, and therefore its explanation is omitted.

The rotate sort function is performed to rotate a sheet orientation associated with data as appropriate depending on a sheet orientation of a target feed tray. Specifically, the rotation process is performed with settings such that the rotation angle is set to 0 degrees when a sheet orientation associated with data is the same as that of the feed tray and the rotation angle is set to 90 degrees when a sheet orientation associated with data is different from that of the feed tray. In the rotation process with the settings of the rotation angle of 90 degrees, the landscape orientation is changed to the portrait orientation by the rotation angle of 90 degrees, and the portrait orientation is changed to the landscape orientation by the rotation angle of 90 degrees. As shown in FIG. 10, after the data written in the first pipe 41*a* is enlarged, reduced, or generated in full size, the sheet orientation associated with the data is rotated 0 degrees or 90 degrees as appropriate, and the data is output to a feed tray with the sheet size A4 and the landscape orientation.

Although it is explained in the example 1 of the first embodiment that the image processing apparatus has the basic reduce/enlarge function and the rotation function, it is possible to configure the image processing apparatus to further include the advanced reduce/enlarge function. Moreover, an image quality mode can be set as the processing condition. The image quality mode includes a character mode for output of a clear character, a photographic mode for output with high image quality, and a character/photographic mode for output of a document including a character and a photograph in a mixed manner.

As described above, the input filter 300 assigns an identifier to data and the output filter 320 sends a read request including the identifier and a data generation condition to the process filter 310, so that a request from the output filter 320 can be reflected on the input filter 300 in an easy manner. As a result, it is possible to set detailed settings of a process in the input filter 300 and the process filter 310 depending on an output request and to customize a function, resulting in an improved performance.

Furthermore, the image processing apparatus has the basic reduce/enlarge function, the advanced reduce/enlarge function, and the rotation function, and the data read request including the sheet orientation as the data generation condition is sent to the process filter 310, so that it is possible to rotate an image in accordance with the read request. Therefore, when data cannot be output in a feed tray with a predetermined sheet size due to run out of sheet, sheet jam, or the like, the data is rotated to change the sheet orientation whereby the processed data can be promptly output from a different feed tray with a different sheet orientation.

Figure 11A:
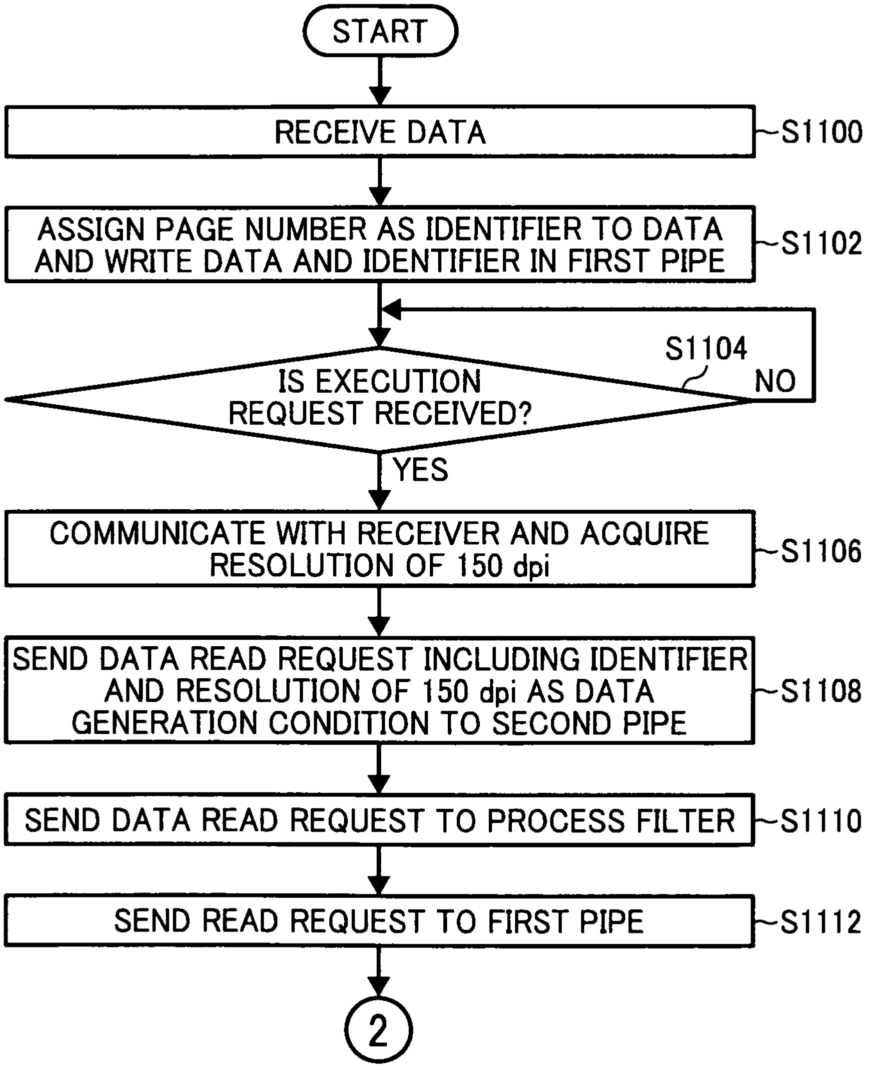
FIG. 11A is a flowchart of an operation performed by the image processing apparatus according to an example 2 of the first embodiment from when a read request is received to when output of data is executed.
Figure 11B:
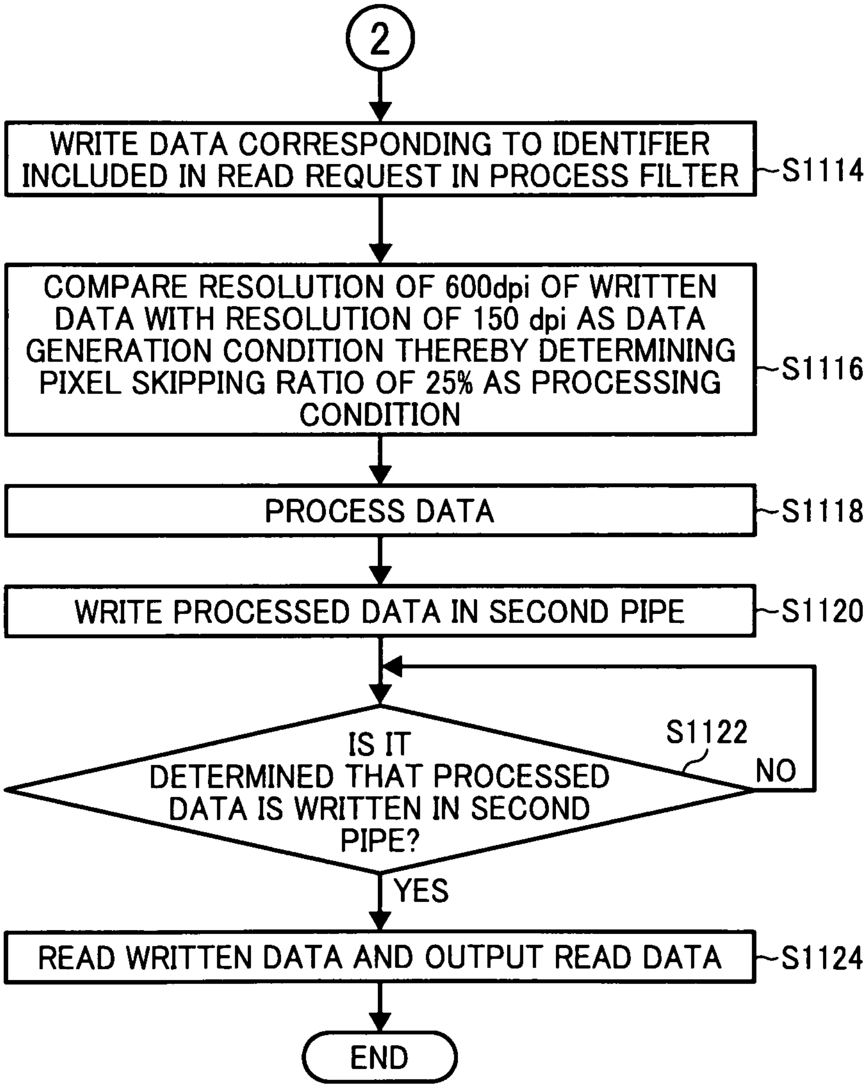
FIG. 11B is a continuation of the flowchart illustrated in FIG. 11A.

FIGS. 11A and 11B is a flowchart of an operation performed by the image processing apparatus according to an example 2 of the first embodiment from when a read request is received to when output of data is executed.

When the input filter 300 receives data from the user (Step S1100), the input filter 300 assigns a page number as an identifier to the received data and writes the data and the identifier in the first pipe 41*a* in an associated manner (Step S1102). The received data can include data about a sheet size, a sheet orientation, resolution in dot per inch (dpi), and the like. In the example 2 of the first embodiment, the resolution of 600 dpi is written in association with the data and the identifier.

Then, the output filter 320 determines whether an execution request of a data output operation is received from the user (Step S1104). If it is determined that the execution request of the data output operation is received from the user (Yes at Step S1104), the output filter 320 communicates with a receiver and acquires the resolution of 150 dpi corresponding to a fax machine arranged in the receiver (Step S1106). The output filter 320 sends a data read request including an identifier associated with data to be output and the resolution of 150 dpi as a data generation condition to the second pipe 41*b* (Step S1108). The second pipe 41*b* sends the data read request to the process filter 310 (Step S1110). If it is not determined that the execution request of the data output operation is received from the user (No at Step S1104), the output filter 320 repeats determination until the output filter 320 receives the execution request of the data output operation.

The process filter 310 sends a read request to the first pipe 41*a* to process data corresponding to the identifier included in the data read request (Step S1112). As described above at Step S1102, the data associated with the identifier is written in the first pipe 41*a*. Upon receiving the read request from the process filter 310, the first pipe 41*a* writes data corresponding to the identifier included in the read request in the process filter 310 (Step S1114 in FIG. 11B). A process from when the first pipe 41*a* receives the read request from the process filter 310 to when data corresponding to the identifier included in the read request is written in the process filter 310 is the same as that described with reference to FIG. 7, and therefore its explanation is omitted.

The process filter 310 compares the resolution of 600 dpi of the data written at Step S1102 with the resolution of 150 dpi as the data generation condition, thereby determining a pixel skipping ratio of 25% as a processing condition (Step S1116). The process filter 310 perform a pixel skipping process on data based on the determined processing condition (Step S1118), and writes the processed data in the second pipe 41*b* (Step S1120).

The output filter 320 determines whether the processed data is written in the second pipe 41*b* (Step S1122). If it is determined that the processed data is written in the second pipe 41*b* (Yes at Step S1122), the output filter 320 reads the written data from the second pipe 41*b* and outputs the read data (Step S1124). On the other hand, if it is not determined that the processed data is written in the second pipe 41*b* (No at Step S1122), the output filter 320 repeats determination until the output filter 320 determines that the data is written in the second pipe 41*b*.

Figure 12:
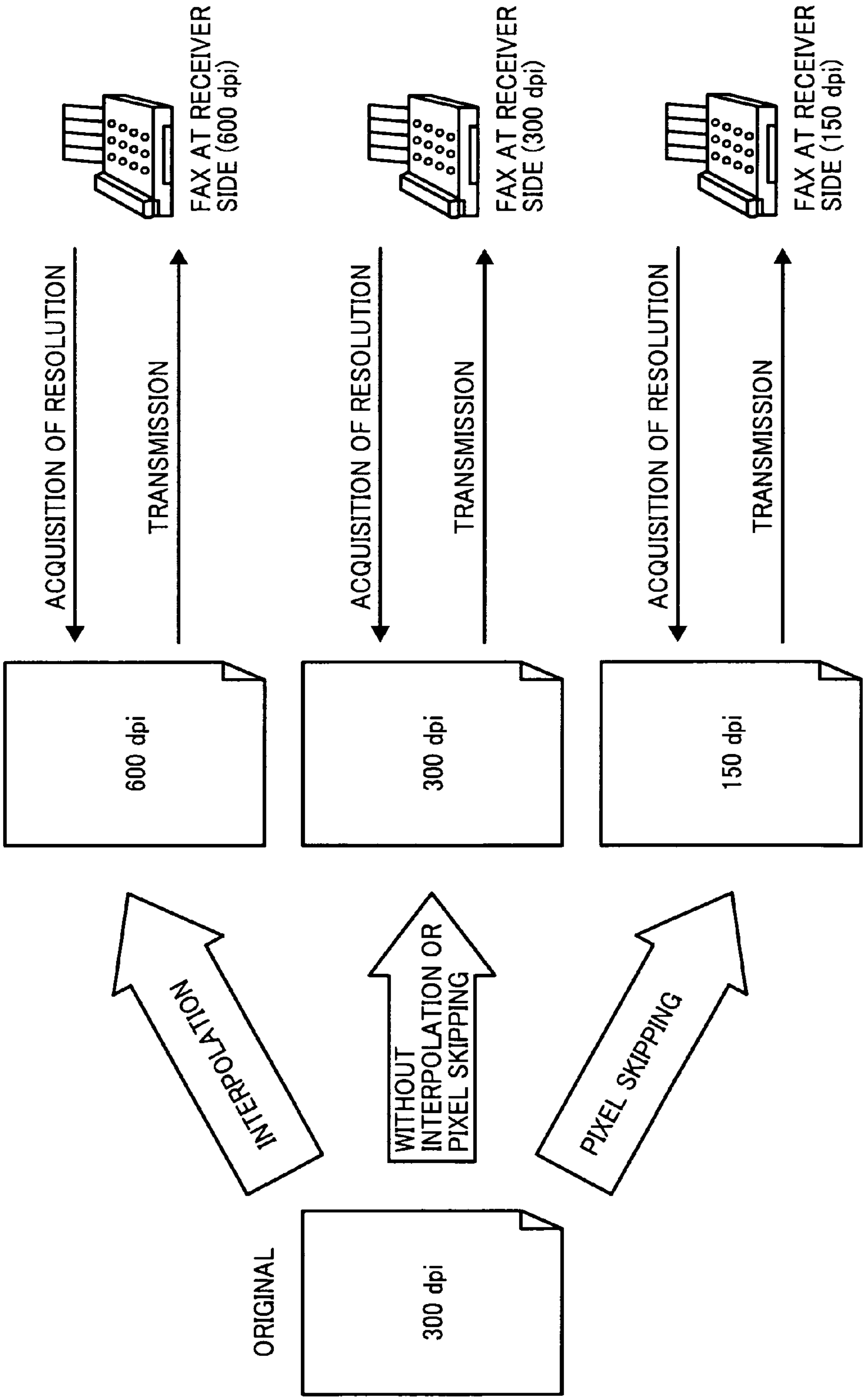
FIG. 12 is a schematic diagram for explaining a resolution adjusting function in the image processing apparatus according to the example 2 of the first embodiment.

FIG. 12 is a schematic diagram for explaining a resolution adjusting function of the image processing apparatus according to the example 2 of the first embodiment. Data having the resolution of 300 dpi that is written in the first pipe 41*a* by the input filter 300 is shown on the left-hand side of FIG. 12. The image processing apparatus communicates with the receiver to acquire the resolution of 600 dpi, 300 dpi, or 150 dpi corresponding to a fax machine arranged in the receiver. The output filter 320 sends the acquired resolution as an output request to the process filter 310 via the second pipe 41*b*. The process filter 310 performs an interpolation process or a pixel skipping process on data based on the acquired resolution and sends the processed data to the output filter 320, and the output filter 320 outputs the data with the resolution corresponding to the fax machine in the receiver.

Although it is explained in the example 2 of the first embodiment that the image processing apparatus has the resolution adjusting function, it is possible to configure the image processing apparatus to further include the basic reduce/enlarge function, the advanced reduce/enlarge function, and the rotation function. Furthermore, an image quality mode can be set as the processing condition. The image quality mode includes a character mode for output of a clear character, a photographic mode for output with high image quality, and a character/photographic mode for output of a document including a character and a photograph in a mixed manner.

As described above, the input filter 300 assigns an identifier to data and the output filter 320 sends a read request including the identifier and a data generation condition to the process filter 310, so that a request from the output filter 320 can be reflected on the input filter 300 in an easy manner. As a result, it is possible to set detailed settings of a process in the input filter 300 and the process filter 310 depending on an output request and to customize a function, resulting in an improved performance.

Furthermore, the data read request including the sheet size as the data generation condition is sent to the process filter 310, so that it is possible to enlarge or reduce an image size in accordance with a read request. Therefore, when data cannot be output with a predetermined sheet size due to run out of sheet, or the like, the data size is enlarged or reduced to change a sheet size whereby the data can be promptly output in response to a new output request.

Moreover, the image processing apparatus has the resolution adjusting function, and even if the image processing apparatus has different resolution from that of the fax machine in the receiver to which data is to be output, the image processing apparatus communicates with the receiver to acquire the resolution corresponding to the fax machine in the receiver, and sends a data read request including the acquired resolution as the data generation condition to the process filter 310, so that the interpolation process or the pixel skipping process can be performed on an image in the input filter 300 or the process filter 310. Thus, because the resolution is adjusted as appropriate depending on the resolution corresponding to the fax machine in the receiver, it is possible to promptly transmit image data to the receiver.

As described above, in the first embodiment, the process filter 310 acquires data corresponding to the identifier included in the read request from the first pipe 41*a* and compares the acquired data with the data generation condition included in the read request and processes the data in accordance with an output request. In a second embodiment of the present invention, an output filter 330 includes a data list 334 in which data is stored and a data retrieving unit 333. When an output request is received, data corresponding to an identifier included in the output request is retrieved from the data list 334, and if the data is contained in the data list, the data is output.

Figure 13:
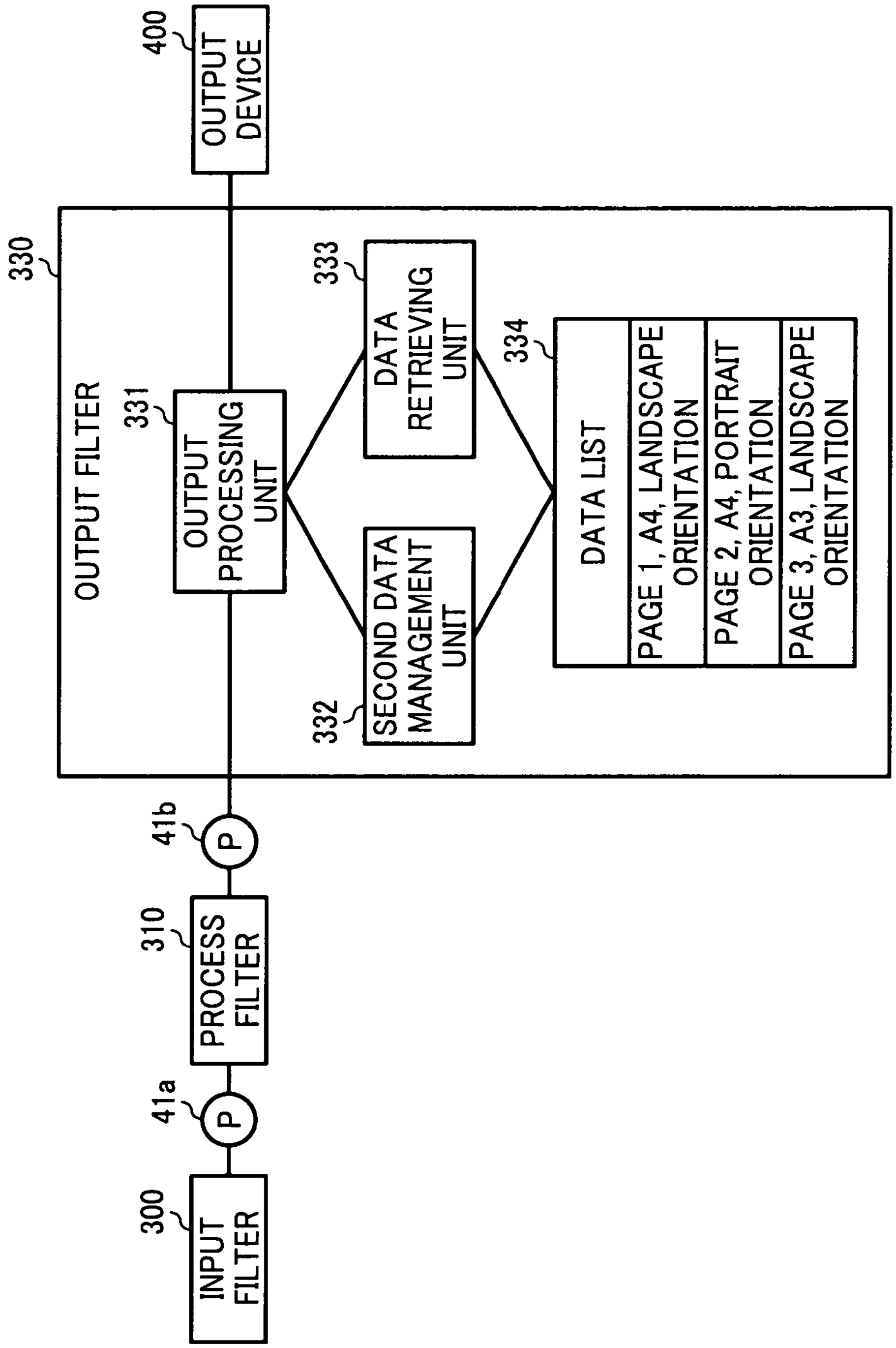
FIG. 13 is a schematic diagram for explaining the configuration of the input filter, the process filter, an output filter, the first pipe, and the second pipe in an image processing apparatus according to a second embodiment of the present invention.

FIG. 13 is a schematic diagram for explaining the configuration of the input filter 300, the process filter 310, the output filter 330, the first pipe 41*a*, and the second pipe 41*b* in an image processing apparatus according to the second embodiment. The output filter 330 includes an output processing unit 331. The input side of the output filter 330 is connected to the second pipe 41*b*, and the output side of the output filter 330 is connected to an output device 400. The output device 400 displays data processed in accordance with an output request received from the user on a screen (not shown). Each of the input filter 300, the process filter 310, the first pipe 41*a*, and the second pipe 41*b* has the same function and configuration as those in the first embodiment.

The output processing unit 331 outputs data in response to an output request received from the user. A second data management unit 332, the data retrieving unit 333, and the data list 334 are connected to the output processing unit 331. The data list 334 contains data processed by the process filter 310. Data is registered in the data list 334 in association with a page number as an identifier, a sheet size, and a sheet orientation. The data retrieving unit 333 retrieves data from the data list 334 in response to an output request. Specifically, the data retrieving unit 333 retrieves data corresponding to the identifier included in a data read request. The second data management unit 332 manages data registered in the data list 334 and performs a registration process in the data list 334. The second data management unit 332 acquires data processed by the process filter 310 from the output processing unit 331 and registers the acquired data in the output filter 330 or the data list 334.

Figure 14:
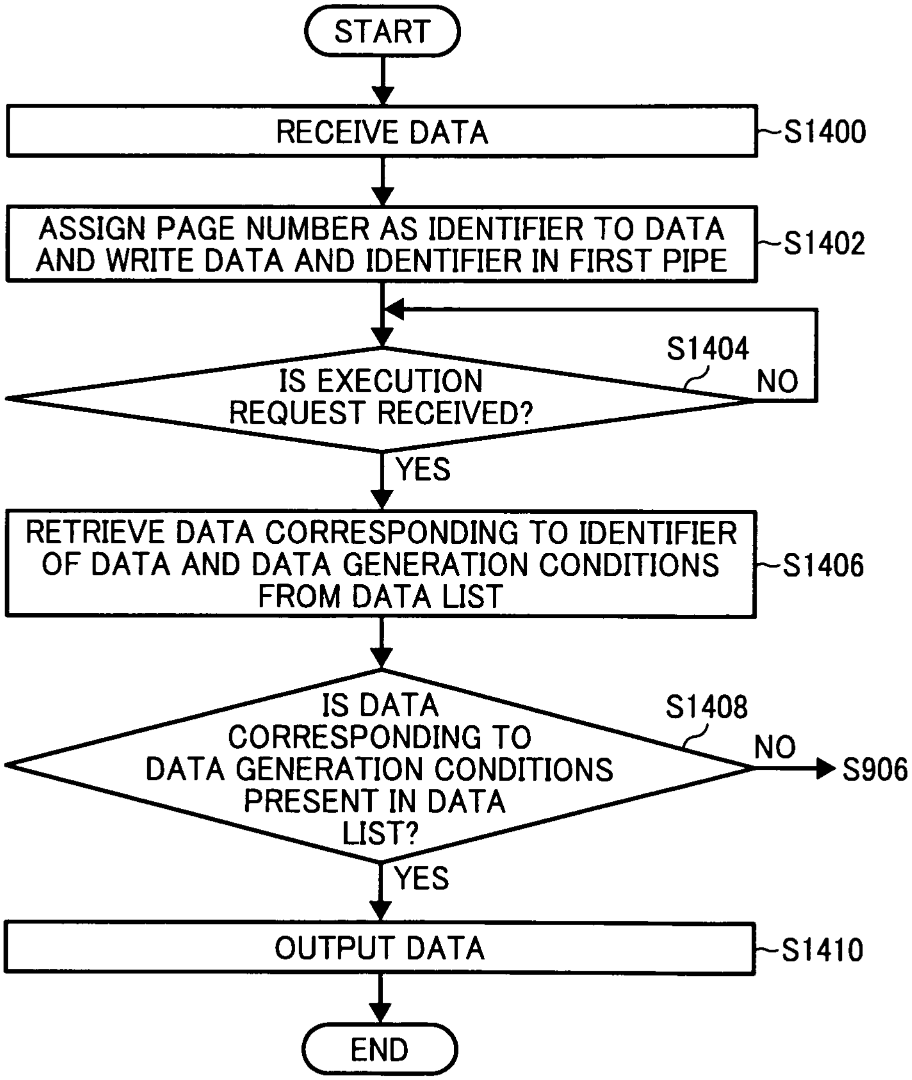
FIG. 14 is a flowchart of an operation performed by the image processing apparatus according to the second embodiment from when a read request is received to when output of data is executed.

FIG. 14 is a flowchart of an operation performed by the image processing apparatus according to the second embodiment from when a read request is received to when output of data is executed. The image processing apparatus having the basic reduce/enlarge function and the rotation function is explained as an example in the second embodiment.

When the input filter 300 receives data from the user (Step S1400), the input filter 300 assigns a page number as an identifier to the received data and writes the data and the identifier in the first pipe 41*a* in an associated manner (Step S1402). The received data can include data about a sheet size, a sheet orientation, and the like. In the second embodiment, the sheet size A3 and the portrait orientation are written in association with the data and the identifier. Although it is explained in the second embodiment that the page number is assigned as the identifier, a number can be assigned to data in order, beginning with the first data acquired by the input filter 300. For example, in the case of image data read by the scanning device 21, it is possible that a data number is assigned to data in order, beginning with the first data read by the scanning device 21, and the data number is used as the identifier. The identifier is not limited to such an order. Any identifier can be used if data can be identified with the identifier. For example, a sheet size, resolution, an image quality mode, or the like, of input data can be used as the identifier.

The output filter 330 then determines whether an execution request of a data output operation is received from the user (Step S1404). If it is determined that the execution request of the data output operation is received from the user (Yes at Step S1404), the data retrieving unit 333 retrieves data corresponding to the identifier of the data and the sheet size A4 and the landscape orientation as the data generation conditions included in the execution request from the data list 334 (Step S1406). On the other hand, if it is not determined that the execution request of the data output operation is received from the user (No at Step S1404), the output filter 330 repeats determination.

As shown in FIG. 13, data including the page number 1, the sheet size A4, and the landscape orientation is registered as data corresponding to the page number 1 included in the execution request in a first line of the data list 334. If the data retrieving unit 333 determines that the data corresponding to the data generation conditions included in the execution request is present in the data list 334 (Yes at Step S1408), the output processing unit 331 acquires the corresponding data from the data list 334 and outputs the acquired data (Step S1410). On the other hand, if the data retrieving unit 333 does not determine that the data corresponding to the data generation conditions included in the execution request is present in the data list 334 (No at Step S1408), the processes at Step S906 and subsequent steps are performed on the data and the processed data is output.

Data processed by the process filter 310 is written in the second pipe 41*b* by the second data management unit 332. It is possible to configure the second data management unit 332 so as to store processed data in the data list 334. Such a configuration will be explained later in examples of the second embodiment.

Although the second data management unit 332 is included in the output filter 330, the second data management unit 332 can be included in the process filter 310. Moreover, although the process filter 310 enlarges or reduces the data size in response to an output request in the second embodiment, it is possible to configure the input filter 300 so as to change a data size into a predetermined sheet size when the data is input.

Because output data on which the basic reduce/enlarge process and the rotation process have been performed by the above operation is the same as the example shown on the top of FIG. 10, its explanation is omitted. Although the image processing apparatus having the basic reduce/enlarge function and the rotation function is explained as an example in the second embodiment, it is possible to configure the image processing apparatus to further include the advanced reduce/enlarge function. Furthermore, an image quality mode can be set as the processing condition. The image quality mode includes a character mode for output of a clear character, a photographic mode for output with high image quality, and a character/photographic mode for output of a document including a character and a photograph in a mixed manner. Although it is explained in the second embodiment that the process filter 310 enlarges or reduces the data size by using the sheet size as the data generation condition, a process performed by the image processing apparatus is not limited to the above processes. Alternatively, it is possible that a data read request including a sheet orientation or image resolution as the data generation condition is sent to the process filter 310 and the process filter 310 performs the rotation process, the pixel skipping process, the interpolation process, or the like, on data.

If data corresponding to the data generation condition is stored in the data list 334, the output processing unit 331 outputs the data from the data list 334. Therefore, when the data cannot be output due to an error, an interrupt, or the like, the output filter 330 can promptly output desired data without making a data read request to the input filter 300.

Figure 15:
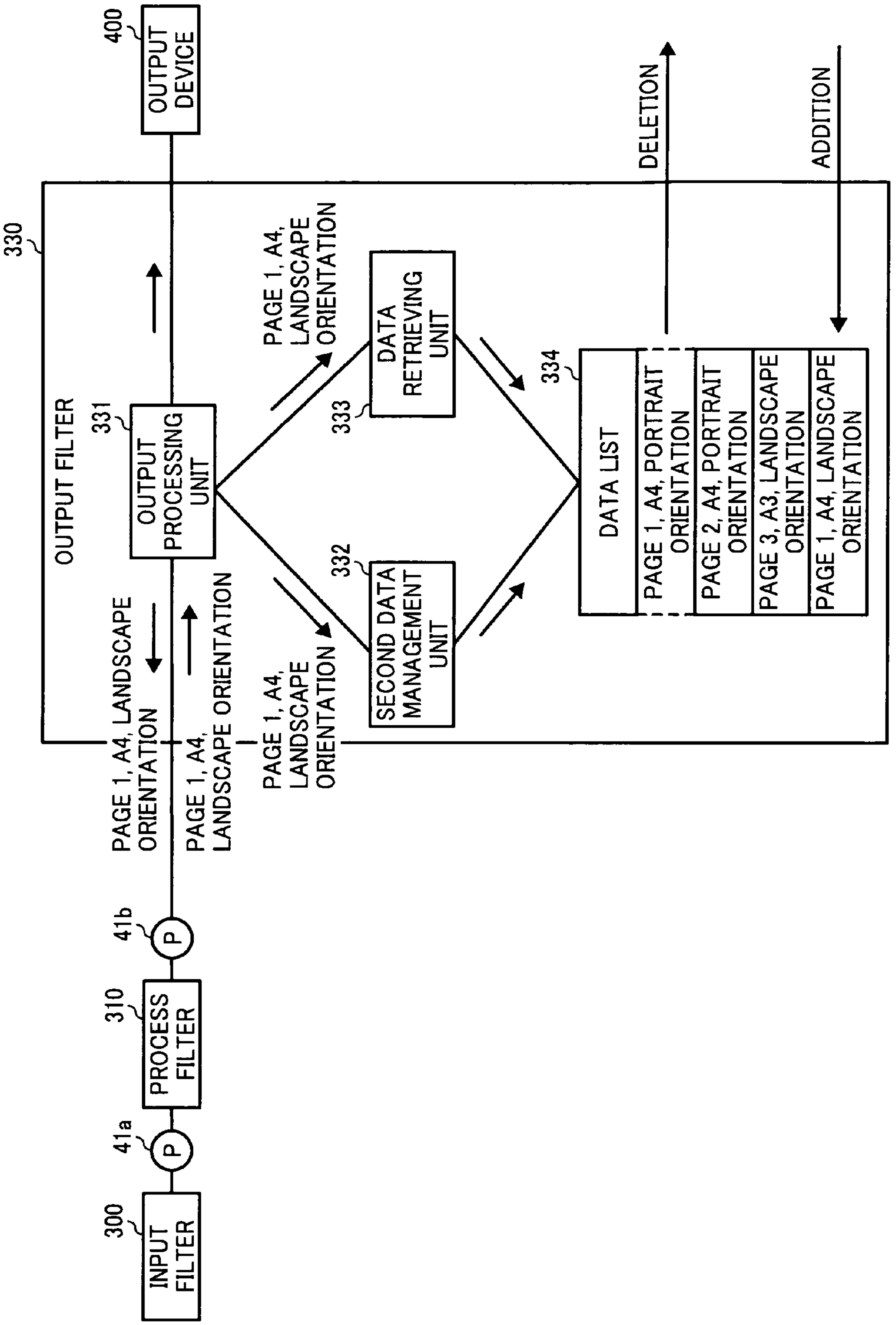
FIG. 15 is a schematic diagram for explaining the configuration of the input filter, the process filter, the output filter, the first pipe, and the second pipe according to an example 1 of the second embodiment.

FIG. 15 is a schematic diagram for explaining the configuration of the input filter 300, the process filter 310, the output filter 330, the first pipe 41*a*, and the second pipe 41*b* according to an example 1 of the second embodiment. The input filter 300, the process filter 310, the first pipe 41*a*, the second pipe 41*b*, the output filter 330, and the output device 400 have the same function and configuration as those in the second embodiment. In the example 1 of the second embodiment, the output request includes the page number 1 as the identifier and the sheet size A4 and the landscape orientation as the data generation conditions. On the other hand, data including the page number 1, the sheet size A4, and the portrait orientation is stored as data corresponding to the page number 1 included in the read request in the data list 334.

Figure 16A:
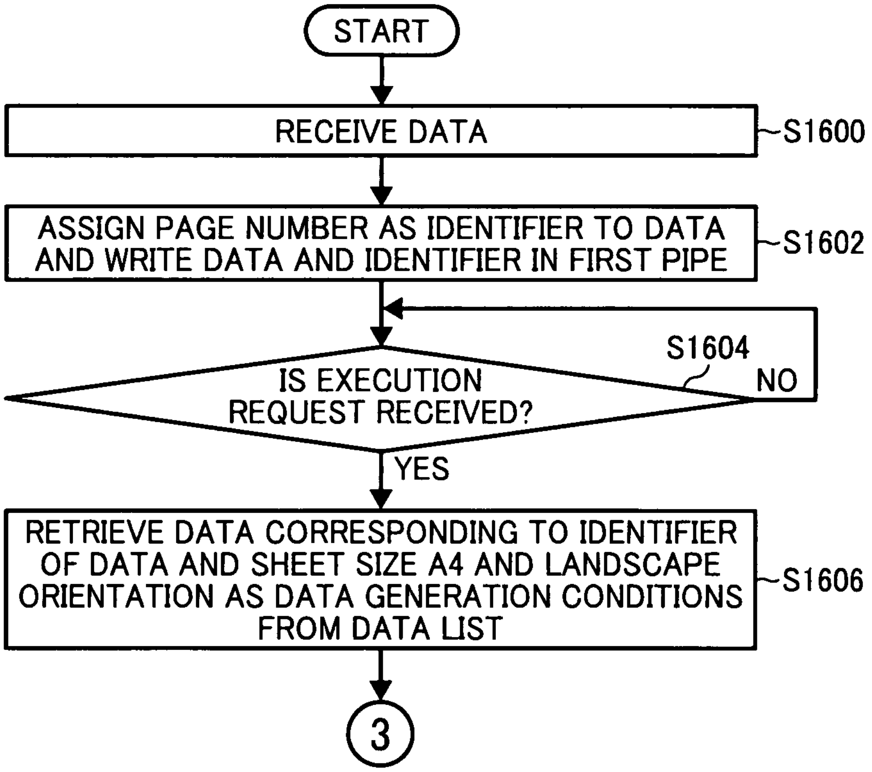
FIG. 16A is a flowchart of an operation performed by the image processing apparatus according to the example 1 of the second embodiment from when a read request is received to when output of data is executed.
Figure 16B:
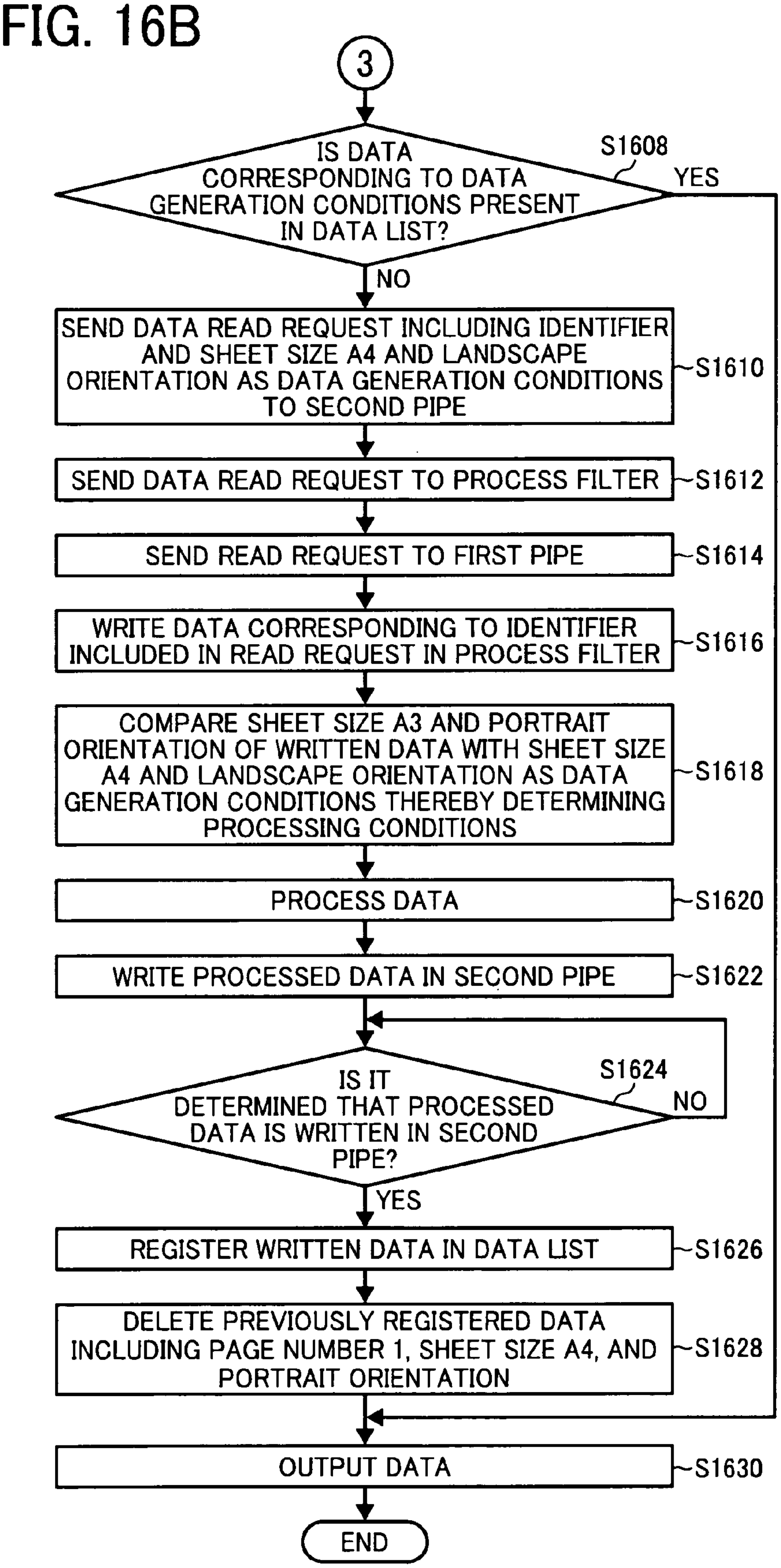
FIG. 16B is a continuation of the flowchart illustrated in FIG. 16A.

FIGS. 16A and 16B is a flowchart of an operation performed by the image processing apparatus according to the example 1 of the second embodiment from when a read request is received to when output of data is executed. The image processing apparatus having the basic reduce/enlarge function and the rotation function is explained as an example in the example 1.

When the input filter 300 receives data from the user (Step S1600), the input filter 300 assigns a page number as an identifier to the received data and writes the data and the identifier in the first pipe 41*a* in an associated manner (Step S1602). The received data can include data about a sheet size, a sheet orientation, and the like. In the example 1 of the second embodiment, the sheet size A3 and the portrait orientation are written in association with the data and the identifier. Although it is explained in the example 1 of the second embodiment that the page number is assigned as the identifier, a number can be assigned to data in order, beginning with the first data acquired by the input filter 300. For example, in the case of image data read by the scanning device 21, it is possible that a data number is assigned to data in order, beginning with the first data read by the scanning device 21, and the data number is used as the identifier. The identifier is not limited to such an order. Any identifier can be used if data can be identified with the identifier. For example, a sheet size, resolution, an image quality mode, or the like, of input data can be used as the identifier.

The output filter 330 then determines whether an execution request of a data output operation is received from the user (Step S1604). If it is determined that the execution request of the data output operation is received from the user (Yes at Step S1604), the data retrieving unit 333 retrieves data corresponding to the identifier of the data and the sheet size A4 and the landscape orientation as the data generation conditions included in the execution request from the data list 334 (Step S1606). In the example 1 of the second embodiment, data including the sheet size A4 and the portrait orientation is stored in the data list 334 corresponding to the page number 1 as the identifier.

If the data retrieving unit 333 determines that the data corresponding to the data generation conditions included in the execution request is not present in the data list 334 (No at Step S1608 in FIG. 16B), the output filter 330 sends a data read request including the identifier associated with data to be output and the sheet size A4 and the landscape orientation as the data generation conditions to the second pipe 41*b* (Step S1610). The second pipe 41*b* sends the data read request to the process filter 310 (Step S1612). The process filter 310 sends a read request to the first pipe 41*a* to process the data corresponding to the identifier included in the data read request (Step S1614). Upon receiving the read request from the process filter 310, the first pipe 41*a* writes the data corresponding to the identifier included in the read request in the process filter 310 (Step S1616). If it is not determined that the execution request of the data output operation is received from the user (No at Step S1604), the output filter 320 repeats determination until the output filter 320 receives the execution request of the data output operation. If the data retrieving unit 333 determines that the data corresponding to the identifier and the data generation conditions included in the execution request is present in the data list 334 (Yes at Step S1608), the output processing unit 331 outputs the corresponding data (Step S1630).

The process filter 310 compares the sheet size A3 and the portrait orientation of the data written at Step S1602 with the sheet size A4 and the landscape orientation as the data generation conditions, thereby determining a reduction ratio of 71% and a rotation angle of 90 degrees as processing conditions (Step S1618). The process filter 310 reduces the data size and rotate the sheet orientation associated with the data based on the determined processing conditions (Step S1620), and writes the processed data in the second pipe 41*b* (Step S1622).

The output filter 330 determines whether the processed data is written in the second pipe 41*b* (Step S1624). If it is determined that the processed data is written in the second pipe 41*b* (Yes at Step S1624), the second data management unit 332 registers the written data in the data list 334 (Step S1626), and deletes the previously registered data including the page number 1, the sheet size A4, and the portrait orientation from the data list 334 (Step S1628). The output processing unit 331 reads the written data from the second pipe 41*b* and outputs the read data (Step S1630). On the other hand, if it is not determined that the processed data is written in the second pipe 41*b* (No at Step S1624), the output filter 330 repeats determination until the input filter 300 determines that the data is written in the second pipe 41*b*.

It is explained in the example 1 of the second embodiment that if the data corresponding to the identifier included in the read request is present in the data list 334 and if the data registered in the data list 334 has different data generation conditions from those of the data included in the read request, the data is deleted from the data list 334. Alternatively, it is possible that, if the data corresponding to one of data generation conditions is present in the data list 334, the data is not deleted from the data list 334 and new data is registered together with the data in the data list 334 as described below in an example 2 of the second embodiment.

Furthermore, although it is explained in the example 1 of the second embodiment that the process filter 310 enlarges or reduces the data size or rotates the sheet orientation associated with the data in accordance with an output request, it is possible to configure the input filter 300 so as to change the data size into a predetermined sheet size or change the sheet orientation associated with the data in a predetermined sheet orientation when the data is input.

Because output data on which the basic reduce/enlarge process and the rotation process have been performed by the above operation is the same as the example shown on the top of FIG. 10, its explanation is omitted. Although the image processing apparatus having the basic reduce/enlarge function and the rotation function is explained as an example in the example 1 of the second embodiment, it is possible to configure the image processing apparatus to further include the advanced reduce/enlarge function. Furthermore, an image quality mode can be set as the processing condition. The image quality mode includes a character mode for output of a clear character, a photographic mode for output with high image quality, and a character/photographic mode for output of a document including a character and a photograph in a mixed manner. Although it is explained in the example 1 of the second embodiment that the process filter 310 enlarges or reduces the data size by using the sheet size as the data generation condition, a process performed by the image processing apparatus is not limited to the above processes. Alternatively, it is possible that a data read request including a sheet orientation or image resolution as the data generation condition is sent to the process filter 310 and the process filter 310 performs the rotation process, the pixel skipping process, the interpolation process, or the like, on data.

As described above, if the data registered in the data list 334 have different data generation conditions from those of the data included in the read request, the data is deleted from the data list 334. Thus, if the data cannot be output due to an error, an interrupt, run out of sheet, or the like, when data is to be output from a different feed tray again, data corresponding to the identifier and the data generation conditions in the data list 334 can be used. Therefore, it is possible to promptly output the data again from a different feed tray without sending an unnecessary read request.

If the data cannot be output due to an error, an interrupt, run out of sheet, or the like, and if the data corresponding to the identifier and the data generation condition is not present in the data list 334 when the data is to be output from a different feed tray again, a read request can be sent to the second pipe 41*b*. Therefore, it is possible to prevent data amount from being increased in the second data management unit 332 by deleting unnecessary data.

Figure 17:
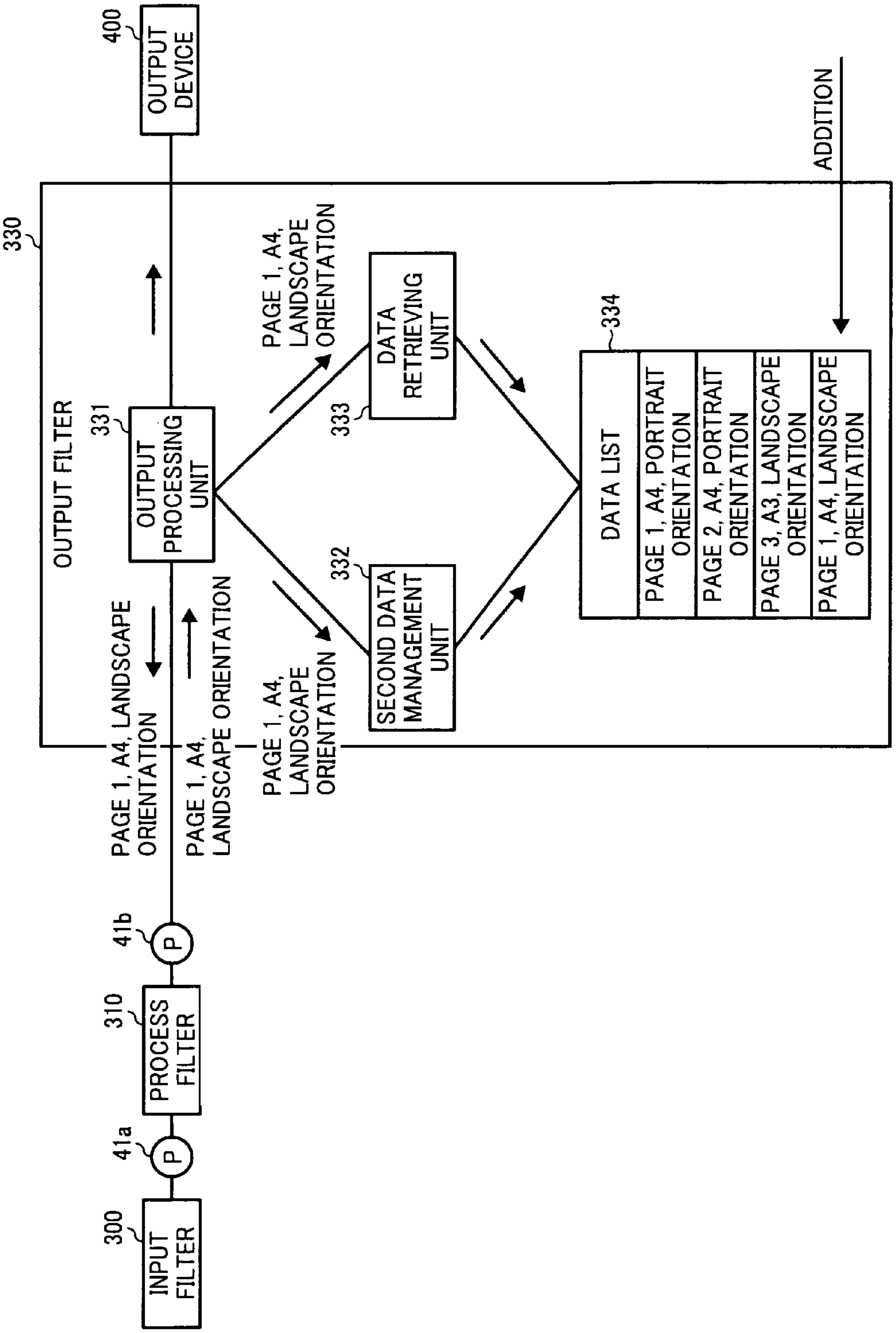
FIG. 17 is a schematic diagram for explaining the configuration of the input filter, the process filter, the output filter, the first pipe, and the second pipe according to an example 2 of the second embodiment.

FIG. 17 is a schematic diagram for explaining the configuration of the filters 300, 310, and 330 and the pipes 41*a* and 41*b* in the image processing apparatus according to an example 2 of the second embodiment. The input filter 300, the process filter 310, the first pipe 41*a*, the second pipe 41*b*, the output filter 330, and the output device 400 have the same functions and configurations as those in the second embodiment. In the example 2 of the second embodiment, the output request includes the page number 1 as the identifier and the sheet size A4 and the landscape orientation as the data generation conditions. On the other hand, data including the page number 1, the sheet size A4, and the portrait orientation is registered as data corresponding to the page number 1 included in the read request in the data list 334.

Figure 18A:
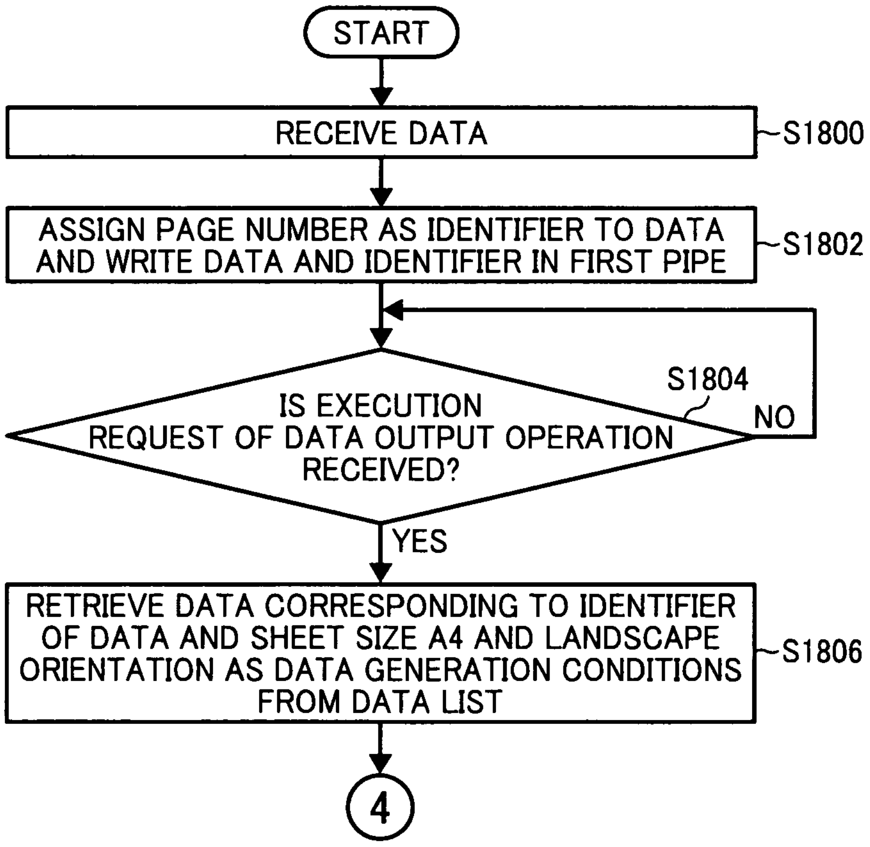
FIG. 18A is a flowchart of an operation performed by the image processing apparatus according to the example 2 of the second embodiment from when a read request is received to when output of data is executed.
Figure 18B:
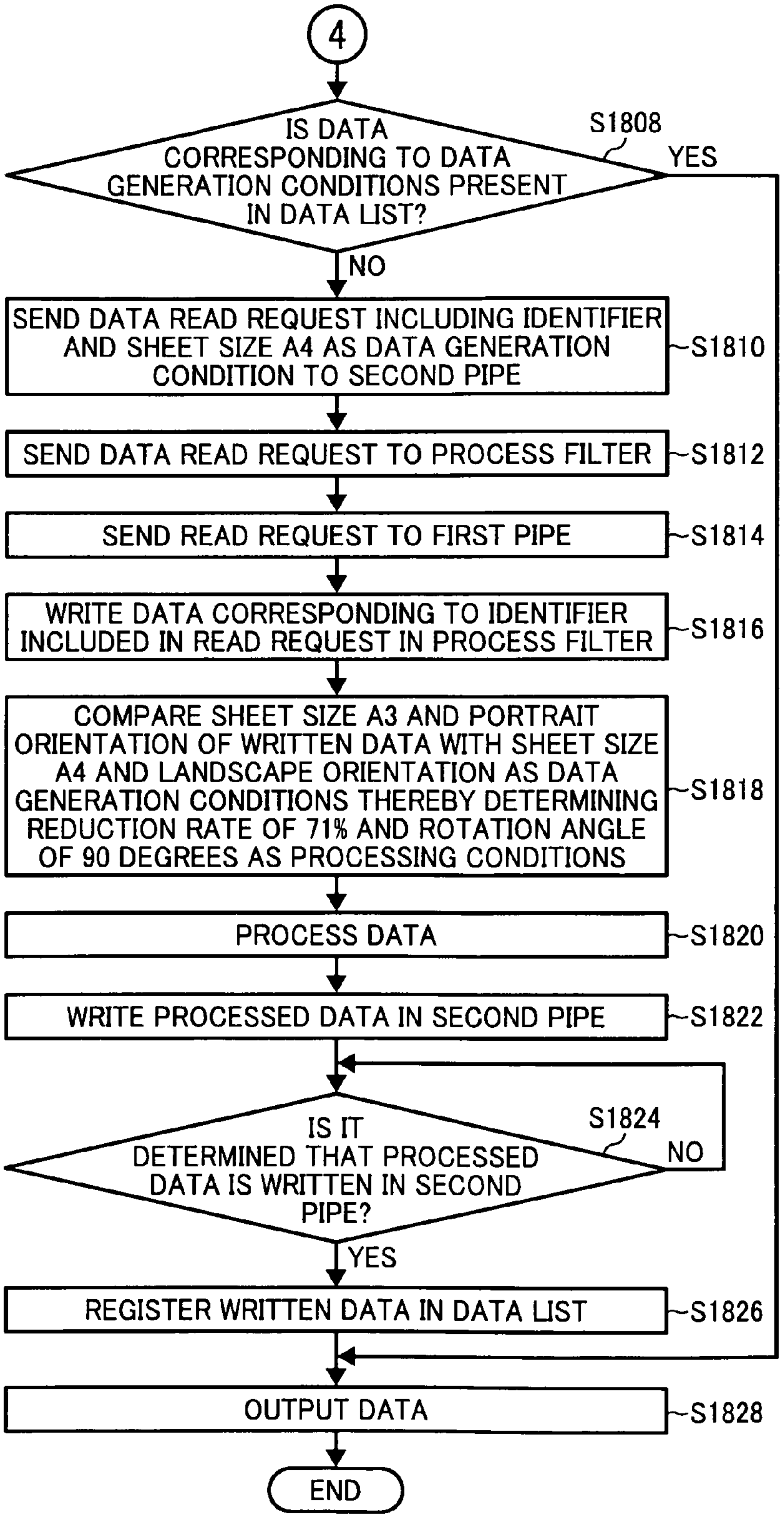
FIG. 18B is a continuation of the flowchart illustrated in FIG. 18A.

FIGS. 18A and 18B is a flowchart of an operation performed by the image processing apparatus according to the example 2 of the second embodiment from when a read request is received to when output of data is executed. The image processing apparatus has the basic reduce/enlarge function and the rotation function.

When the input filter 300 receives data from the user (Step S1800), the input filter 300 assigns a page number as an identifier to the received data and writes the data and the identifier in the first pipe 41*a* in an associated manner (Step S1802). The received data can include data about a sheet size, a sheet orientation, and the like. In the example 2 of the second embodiment, the sheet size A3 and the portrait orientation are written in association with the data and the identifier. Although it is explained in the example 2 of the second embodiment that the page number is assigned as the identifier, a number can be assigned to data in order, beginning with the first data acquired by the input filter 300. For example, in the case of image data read by the scanning device 21, it is possible that a data number is assigned to data in order, beginning with the first data read by the scanning device 21, and the data number is used as the identifier. The identifier is not limited to such an order. Any identifier can be used if data can be identified with the identifier. For example, a sheet size, resolution, or an image quality mode of received data, or the like, can be used as the identifier.

The output filter 330 then determines whether an execution request of a data output operation is received from the user (Step S1804). If it is determined that the execution request of the data output operation is received from the user (Yes at Step S1804), the data retrieving unit 333 retrieves data corresponding to the identifier of the data and the sheet size A4 and the landscape orientation as the data generation conditions included in the execution request from the data list 334 (Step S1806). In the example 2 of the second embodiment, data including the sheet size A4 and the portrait orientation is registered as data corresponding to the page number 1 in the data list 334.

If the data retrieving unit 333 determines that the data corresponding to the data generation conditions included in the output request is not present in the data list 334 (No at Step S1808 in FIG. 18B), the output filter 330 sends a data read request including the identifier corresponding to data to be output and the sheet size A4 and the landscape orientation as the data generation conditions to the second pipe 41*b* (Step S1810). The second pipe 41*b* sends the data read request to the process filter 310 (Step S1812). The process filter 310 sends a read request to the first pipe 41*a* to perform a processing operation on data corresponding to the identifier included in the data read request (Step S1814). Upon receiving the read request from the process filter 310, the first pipe 41*a* writes the data corresponding to the identifier included in the read request in the process filter 310 (Step S1816). If it is not determined that the execution request of the data output operation is received from the user (No at Step S1804), the output filter 320 repeats determination until the output filter 320 receives the execution request of the data output operation. On the other hand, if the data retrieving unit 333 determines that the data corresponding to the identifier and the data generation conditions included in the output request is present in the data list 334 (Yes at Step S1808), the output processing unit 331 outputs the corresponding data (Step S1828).

The process filter 310 compares the sheet size A3 and the portrait orientation of the data written at Step S1802 with the sheet size A4 and the landscape orientation as the data generation conditions, thereby determining a reduction ratio of 71% and a rotation angle of 90 degrees as processing conditions (Step S1818). The process filter 310 reduces the data size and rotates the sheet orientation associated with the data based on the determined processing conditions (Step S1820), and writes the processed data in the second pipe 41*b* (Step S1822).

The output filter 330 determines whether the processed data is written in the second pipe 41*b* (Step S1824). If it is determined that the processed data is written in the second pipe 41*b* (Yes at Step S1824), the second data management unit 332 registers the written data, i.e., the data corresponding to the page number 1, the sheet size A4, and the landscape orientation, in the data list 334 together with the registered data, i.e., the data corresponding to the page number 1, the sheet size A4, and the portrait orientation (Step S1826). The output processing unit 331 reads the written data from the second pipe 41*b* and outputs the read data (Step S1828). On the other hand, if it is not determined that the processed data is written in the second pipe 41*b* (No at Step S1824), the output filter 330 repeats determination until the output filter 330 determines that the data is written in the second pipe 41*b*.

Furthermore, although it is explained in the example 2 of the second embodiment that the process filter 310 enlarges or reduces the data size or rotates the sheet orientation associated with the data in accordance with the output request, it is possible to configure the input filter 300 so as to change a data size into a predetermined sheet size or change the sheet orientation associated with the data in a predetermined sheet orientation when the data is input.

Because output data on which the basic reduce/enlarge process and the rotation process have been performed by the above operation is the same as the example shown on the top of FIG. 10, its explanation is omitted. Although the image processing apparatus having the basic reduce/enlarge function and the rotation function is explained as an example in the example 2 of the second embodiment, it is possible to configure the image processing apparatus to further include the advanced reduce/enlarge function. Furthermore, an image quality mode can be set as the processing condition. The image quality mode includes a character mode for output of a clear character, a photographic mode for output with high image quality, a character/photographic mode that for output of a document including a character and a photograph in a mixed manner. Although it is explained above that the process filter 310 enlarges or reduces the data size by using the sheet size as the data generation condition, a process performed by the image processing apparatus is not limited to the above processes. Alternatively, it is possible that a data read request including a sheet orientation or image resolution as the data generation condition is sent to the process filter 310 and the process filter 310 performs the rotation process, the pixel skipping process, the interpolation process, or the like, on data.

As described above in the example 2 of the second embodiment, if the data corresponding to the identifier included in the read request is present in the data list 334 and if the data registered in the data list 334 have different data generation conditions from those of the data included in the read request, the data registered in the data list 334 is not deleted and is registered together with the data included in the read request. Thus, when the data registered in the data list 334 needs to be output again, it is possible to promptly output the data again without sending the read request.

Although the image processing apparatuses according to the first and the second embodiments above are explained above, various modifications and improvements can be made to the embodiments.

According to an aspect of the present invention, it is possible to simplify customization and expansion of a function by individually performing a function of each filter.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:

an input control unit that controls input of image data;

a processing unit that processes the image data;

an output control unit that controls output of the image data;

a first sending unit that sends the image data from the input control unit to the processing unit; and a second sending unit that sends the image data from the processing unit to the output control unit, wherein the input control unit assigns a unique identifier to the image data and writes the image data and the unique identifier in the first sending unit, upon receiving an output request including a unique identifier and a data generation condition of the image data, the output control unit sends a data read request including the unique identifier and the data generation condition to the second sending unit, the second sending unit sends the data read request to the processing unit, the processing unit sends the data read request to the first sending unit, the first sending unit writes the image data corresponding to the unique identifier included in the data read request in the processing unit, and the processing unit compares the image data written by the first sending unit with the data generation condition included in the data read request received from the second sending unit thereby determining a processing condition required for outputting the image data based on the data generation condition, processes the image data based on the processing condition to generate processed image data, and outputs the processed image data to the output control unit via the second sending unit.

2. The image processing apparatus according to claim 1, wherein the data generation condition includes data indicative of a size of the image data, and the processing unit has an enlargement function to enlarge the size of the image data, so that the processing unit compares the size of the image data with the data generation condition to determine an enlargement ratio as the processing condition and enlarges the size of the image data based on the enlargement ratio.

3. The image processing apparatus according to claim 1, wherein the data generation condition includes data indicative of a size of the image data, and the processing unit has a reduction function to reduce the size of the image data, so that the processing unit compares the size of the image data with the data generation condition to determine a reduction ratio as the processing condition and reduces the size of the image data based on the reduction ratio.

4. The image processing apparatus according to claim 1, wherein the data generation condition includes data indicative of an orientation of the image data, and the processing unit has a rotation function to rotate the image data, so that the processing unit compares the orientation of the image data with the data generation condition to determine a rotation angle as the processing condition and rotates the image data based on the rotation angle.

5. The image processing apparatus according to claim 1, wherein the data generation condition includes data indicative of a resolution of the image data, and the processing unit has a resolution-correction function to correct resolution of the image data, so that the processing unit compares the resolution of the image data with the data generation condition to determine a pixel skipping ratio as the processing condition and corrects resolution of the image data based on the pixel skipping ratio.

6. The image processing apparatus according to claim 5, wherein the processing unit compares the resolution of the image data with the data generation condition to determine an interpolation ratio as the processing condition and interpolates the image data based on the interpolation ratio.

7. The image processing apparatus according to claim 1, wherein the processing unit writes the processed image data in the second sending unit, the second sending unit sends the processed image data written by the processing unit to the output control unit, and the output control unit includes a data list in which the processed image data received from the second sending unit is stored;

a data management unit that manages the data list; and a data retrieving unit that, upon receiving the output request, retrieves the processed image data corresponding to a retrieval condition including the unique identifier and the data generation condition included in the output request from the data list.

8. The image processing apparatus according to claim 7, wherein, if the processed image data corresponding to the retrieval condition is not present in the data list, the data retrieving unit sends the data read request to the second sending unit.

9. The image processing apparatus according to claim 7, wherein, if the processed image data corresponding to the retrieval condition is present in the data list, the data retrieving unit acquires the processed image data from the data list and outputs the processed image data.

10. The image processing apparatus according to claim 7, wherein, if the processed image data corresponding to the unique identifier and not corresponding to the data generation condition is present in the data list, the data management unit deletes the processed image data from the data list and stores processed image data corresponding to the retrieval condition received from the second sending unit in the data list.

11. The image processing apparatus according to claim 7, wherein, if the processed image data corresponding to the unique identifier and not corresponding to the data generation condition is present in the data list, the data management unit stores the image data corresponding to the retrieval condition and the image data received from the second sending unit in the data list.

* * * * *